US011238416B1

(12) United States Patent
Hills et al.

(10) Patent No.: US 11,238,416 B1
(45) Date of Patent: Feb. 1, 2022

(54) AVAILABILITY BASED RESOURCE SCHEDULING

(71) Applicant: SkedgeAlert, Inc., Tacoma, WA (US)

(72) Inventors: David Francis Hills, Tacoma, WA (US); David Martin Flajole, Shoreline, WA (US); Lawrence Arthur Larson, Tacoma, WA (US); David Richard Cotter, Mukilteo, WA (US); Darryl Pennock West, Berkeley, CA (US); Cameron Elliott Rounce, Auburn, WA (US); Charles Dorsey Gore, Jr., Puyallup, WA (US); Matthew Scott Rowley, Edmonds, WA (US); Conor Emery McCarthy, Tacoma, WA (US)

(73) Assignee: SkedgeAlert, Inc., Tacoma, WA (US)

( * ) Notice: Subject to any disclaimer, the term of this patent is extended or adjusted under 35 U.S.C. 154(b) by 0 days.

(21) Appl. No.: 17/033,172

(22) Filed: Sep. 25, 2020

(51) Int. Cl.
G06Q 10/10 (2012.01)
G06Q 10/02 (2012.01)
G06Q 30/00 (2012.01)
G06Q 10/06 (2012.01)

(52) U.S. Cl.
CPC ......... *G06Q 10/1095* (2013.01); *G06Q 10/02* (2013.01); *G06Q 10/0631* (2013.01); *G06Q 10/06312* (2013.01); *G06Q 10/06313* (2013.01); *G06Q 30/016* (2013.01); *G06Q 30/0185* (2013.01)

(58) Field of Classification Search
CPC .................................................. G06Q 10/10
See application file for complete search history.

(56) References Cited

U.S. PATENT DOCUMENTS

| 7,472,181 | B2 * | 12/2008 | Hollinger | G06Q 10/02 709/224 |
|---|---|---|---|---|
| 7,930,474 | B2 | 4/2011 | Kano et al. | |
| 8,244,566 | B1 | 8/2012 | Coley et al. | |
| 10,216,754 | B1 | 2/2019 | Douglis et al. | |
| 10,282,667 | B2 * | 5/2019 | Gagne | G06F 30/20 |
| 2004/0019501 | A1 | 1/2004 | White et al. | |

(Continued)

OTHER PUBLICATIONS

Office Communication for U.S. Appl. No. 17/124,255 dated Feb. 10, 2021, pp. 1-7.

(Continued)

*Primary Examiner* — Kurtis Gills
(74) *Attorney, Agent, or Firm* — John W. Branch; Branch Partners PLLC

(57) ABSTRACT

Embodiments are directed to managing resources over a network. One or more resources that are unassigned. Selection models may be generated based on a one or more open appointments or one or more characteristics of one or more clients. The selection models may be employed to determine each client that is qualified to accept one or more invitations to the one or more open appointments. The one or more invitations to accept the one or more open appointments may be provided to the one or more qualified clients based on one or more notification models that define one or more communication modes to communicate the one or more invitations with the one or more candidate clients over a period of time. An open appointment may be reserved based on a qualified client accepting an invitation to the open appointment.

24 Claims, 13 Drawing Sheets

(56) References Cited

U.S. PATENT DOCUMENTS

| | | | |
|---|---|---|---|
| 2005/0027579 A1* | 2/2005 | Tiourine | G06Q 10/06375 |
| | | | 705/7.37 |
| 2006/0161457 A1 | 7/2006 | Rapaport et al. | |
| 2007/0250370 A1* | 10/2007 | Partridge | G06Q 10/1097 |
| | | | 705/7.14 |
| 2010/0280844 A1 | 11/2010 | Larsen | |
| 2011/0038476 A1* | 2/2011 | Anisimov | H04M 3/523 |
| | | | 379/265.14 |
| 2014/0223436 A1* | 8/2014 | Steiner | G06F 9/4843 |
| | | | 718/102 |
| 2017/0124526 A1* | 5/2017 | Sanderford | G06Q 10/1095 |
| 2019/0122760 A1* | 4/2019 | Wang | G06Q 10/02 |
| 2019/0237203 A1 | 8/2019 | Schwabl et al. | |
| 2019/0334907 A1* | 10/2019 | Rodden | G06Q 10/063116 |
| 2021/0225499 A1 | 7/2021 | Takayama | |

OTHER PUBLICATIONS

Office Communication for U.S. Appl. No. 17/124,255 dated Feb. 24, 2021, pp. 1-7.
Office Communication for U.S. Appl. No. 17/219,756 dated Jul. 12, 2021, pp. 1-7.
Office Communication for U.S. Appl. No. 17/219,756 dated Jul. 29, 2021, pp. 1-7.
Office Communication for U.S. Appl. No. 17/336,117 dated Sep. 21, 2021, pp. 1-44.

* cited by examiner

Graphical User Interface 1300

1302 → New Alert | Saved Alerts | Active Alerts | Closed Alerts

1304 → Select Provider | Provider Filters

Alert Type

1306 → ● Serial Alert  ○ Broadcast Alert

Alert Date, Time, Duration and Details

| Date | Time | Duration | |
|---|---|---|---|
| 1308 → 12/01/2020 | 10:00 am | 45 minutes | Details |

1310 → Alert Acceptance Timeout: 10:00 am   Alert Confirmation Timeout: 10:00 am

1312 →

| Customer Name | Email | Phone | |
|---|---|---|---|
| John M | <...> | <...> | <...> |
| Eric C | <...> | <...> | <...> |
| Jane J | <...> | <...> | <...> |
| Ariel A | <...> | <...> | <...> |
| ... | ... | ... | ... |

1314
Client Filters
...
Client Selection Rules

AVAILABILITY BASED RESOURCE SCHEDULING

TECHNICAL FIELD

The present invention relates generally to resource management, and more particularly, but not exclusively, to automatically rescheduling clients with resources that have unplanned availability.

BACKGROUND

Modern organizations provide many systems that enable clients, providers, or users to schedule appointments, including, web based portals, telephonic scheduling, model phone apps, and so on. By providing multiple appointment scheduling systems, organizations can provide convenient and reliable means for clients to schedule appointments. Accordingly, organizations are enabled to efficiently manage their resources to service their scheduled appointments. However, appointment scheduling systems often enable clients, providers, or users to cancel appointments. In some cases, some systems enable clients to easily or conveniently cancel. However, in some cases, if appointments are canceled, the organizations may be left with unassigned resources that were previously allocated for the now canceled appointment. In some cases, this may cause organizations added costs or lost revenue because they may be unable to reschedule the unassigned resources. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 13 illustrates a logical representation of a portion of a user interface or availability based resource scheduling in accordance with one or more of the various embodiments.

DETAILED DESCRIPTION OF VARIOUS EMBODIMENTS

Figure 1:
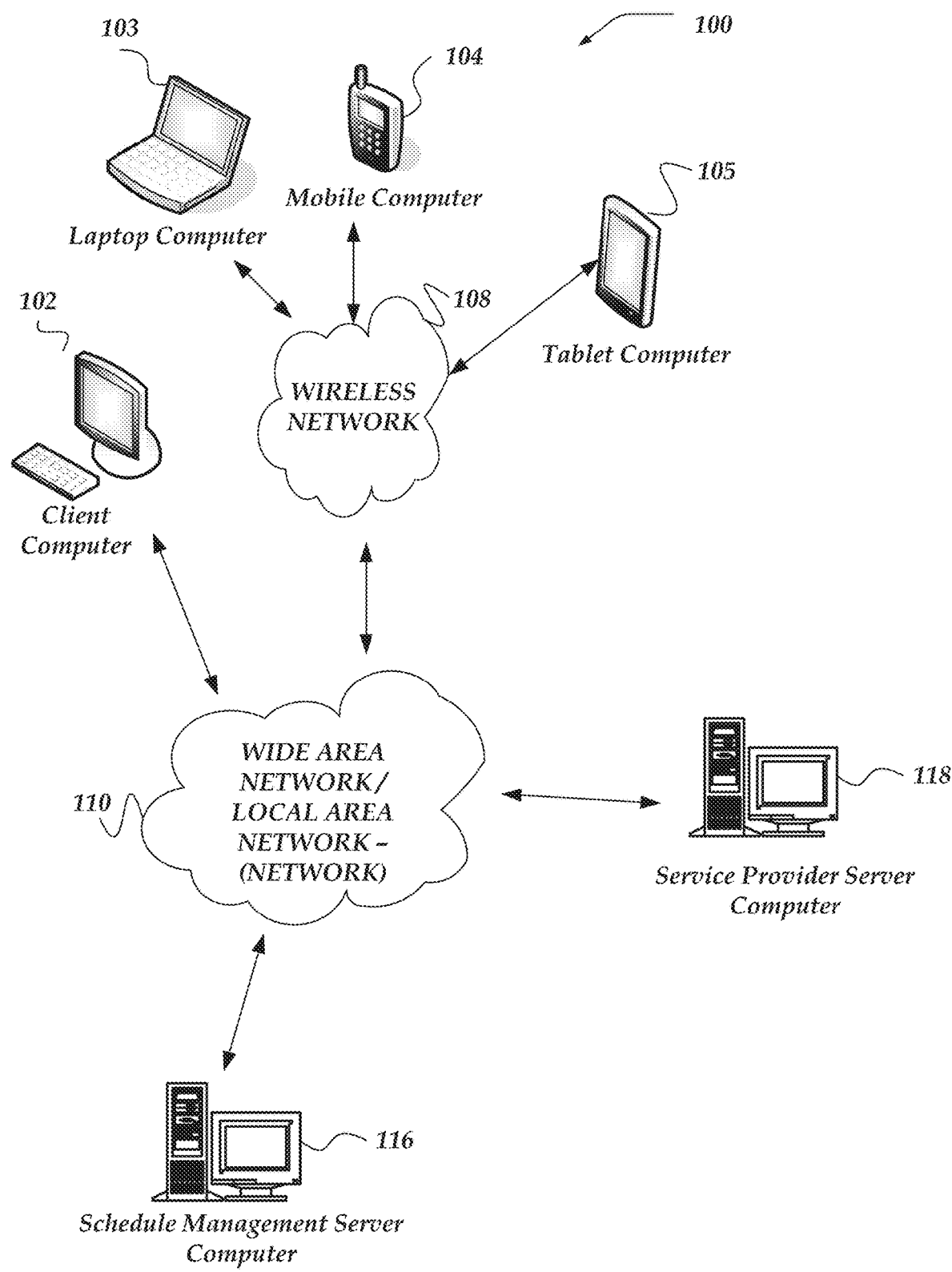
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "resource," or "provider" refer to individuals, groups, or organizations that may offer scheduled services or otherwise employ appointments to schedule if they can provide services to clients. For example, resources or providers may include, physicians, dentists, hair stylists, automobile repair shops, consultants, portrait photographers, or the like.

As used herein the term "client" refers to individuals, customers, groups, or organizations that may have a relationship with an organization that is using appointments to schedule services or otherwise employ appointments to schedule if they can receive services from providers. For example, clients may include, medical patients, dental patients, consumers, employees, volunteers, or the like.

As used herein the term, "selection model" refers to one or more data structures that may be arranged to include one or more heuristics, machine learning classifiers, formulas, conditions, instructions, parameters, state machines, or the like, or combination thereof, that may be employed by a schedule management platform to determine how to select qualified clients for refill canceled appointments. Selection models may define the criteria for selecting qualified clients or sorting/rank qualified clients. Some or all of the qualified clients selected by a selection model may be provided invitations regarding open appointments.

As used herein the term, "notification model" refers to one or more data structures that may be arranged to include one or more heuristics, machine learning classifiers, formulas, conditions, instructions, parameters, state machines, or the like, or combination thereof, that may be employed by a schedule management platform to determine how to provide invitations to qualified clients for open appointments that may be the result of unfilled or canceled appointments. Notification models may determine the communication modes, such as, push notifications, email, SMS, SNS, telephone calls, or the like. Also, notification models may determine the notification behaviors, such as, timeout values, serial delivery, broadcast delivery, or the like.

As used herein term, "open appointment" refers to an unfilled appointment that has been scheduled or otherwise allocated resources. Open appointments may be associated with one or more unassigned resources. In some cases, these are the same resources that were initially associated with a scheduled appointment before it became an open appointment. Also, typically, open appointments occur if clients cancel previously schedule appointments. However, if resources become unexpectedly available, open appointments may be associated with the unexpected unassigned resources.

As used herein the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing resources over a network. In one or more of the various embodiments, one or more resources that are unassigned to one or more open appointments may be determined.

In one or more of the various embodiments, one or more selection models may be generated based on the one or more open appointments or one or more characteristics of one or more clients. In one or more of the various embodiments, generating the one or more selection models, may include: displaying one or more characteristics of the one or more clients in a user interface; employing selection of one or more portions of the one or more characteristics of the clients to generate the one or more selection models; or the like.

In one or more of the various embodiments, the one or more selection models may be employed to determine each client that is qualified to accept one or more invitations to the one or more open appointments.

In one or more of the various embodiments, determining the one or more qualified clients, may include, rank ordering the one or more qualified clients based on selection criteria provided by the one or more selection models, wherein the selection criteria includes one or more of location, priority, services requested, credit history, or the like.

In one or more of the various embodiments, determining the one or more qualified clients may include: providing calendar information that corresponds to the one or more qualified clients from one or more calendar providers, wherein the calendar providers include one or more of a mobile device, a service provider, or a third-party schedule management application; modifying the one or more selection models based on the calendar information; or the like.

In one or more of the various embodiments, the one or more invitations to accept the one or more open appointments may be provided to the one or more qualified clients based on one or more notification models that define one or more communication modes to communicate the one or more invitations with the one or more candidate clients over a period of time.

In one or more of the various embodiments, providing the one or more invitations, may include starting a first confirmation timer that is associated with the invitation being provided to a first qualified client. And, in some embodiments, in response to the first confirmation timer expiring before the first qualified client accepts the invitation, further may be performed, including: determining a next qualified client from a remainder of the one or more other qualified clients; starting a next confirmation timer that is associated with the invitation being provided to the next qualified client; in response to the next qualified client confirming the invitation before the expiry of the next confirmation timer, closing the open appointment by assigning the one or more resources and the next qualified client to the closed appointment; or the like.

In one or more of the various embodiments, providing the one or more invitations, may include broadcasting the one or more invitations to each of the one or more qualified clients concurrently. In some embodiments, in response to one or more other qualified clients accepting the one or more invitations, an acceptance queue that includes the one or more other qualified clients may be generated such that the acceptance queue may be ordered based on an order that the one or more other qualified clients accepted the invitation; and enabling each other qualified client in turn to confirm the acceptance of the invitation to the open appointment based on the acceptance queue.

In one or more of the various embodiments, an open appointment may be reserved based on a qualified client accepting an invitation to the open appointment.

In one or more of the various embodiments, in response to the qualified client confirming the acceptance of the invitation to the open appointment and before expiry of the period of time, the open appointment may be closed by assigning the one or more resources and the qualified client to the closed appointment.

In one or more of the various embodiments, in response to expiry of the period of time and non-confirmation by the qualified client for the open appointment, further actions may be performed, including: unreserving the open appointment for the qualified client; employing the one or more selection models to determine one or more other qualified clients that are qualified to accept one or more invitations to the one or more open appointments; providing the one or more invitations to accept the one or more open appointments to the one or more other qualified clients based on the one or more notification models; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, schedule management server computer 116, service provider server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, schedule management server computer 116, service provider server computer 118, or other computers.

Client computers 102-105 may further be configured to include a client application that enables an end-user to log into an end-user account that may be managed by another computer, such as schedule management server computer 116, service provider server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, schedule management server computer 116, service provider server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of schedule management server computer 116, service provider server computer 118, or the like, are described in more detail below in conjunction with FIG. 3. Although FIG. 1 illustrates schedule management server computer 116, or service provider server computer 118 as a single computer, the innovations or embodiments are not so limited. For example, one or more functions of user management server computer 116, or the like, may be distributed across one or more distinct network computers. In one or more of the various embodiments, schedule management server computer 116 or service provider server computer 118 may be implemented using one or more cloud instances in one or more cloud networks.

Accordingly, these innovations and embodiments are not to be construed as being limited to a single environment, and other configurations, and other architectures are also envisaged.

Illustrative Client Computer

Figure 2:
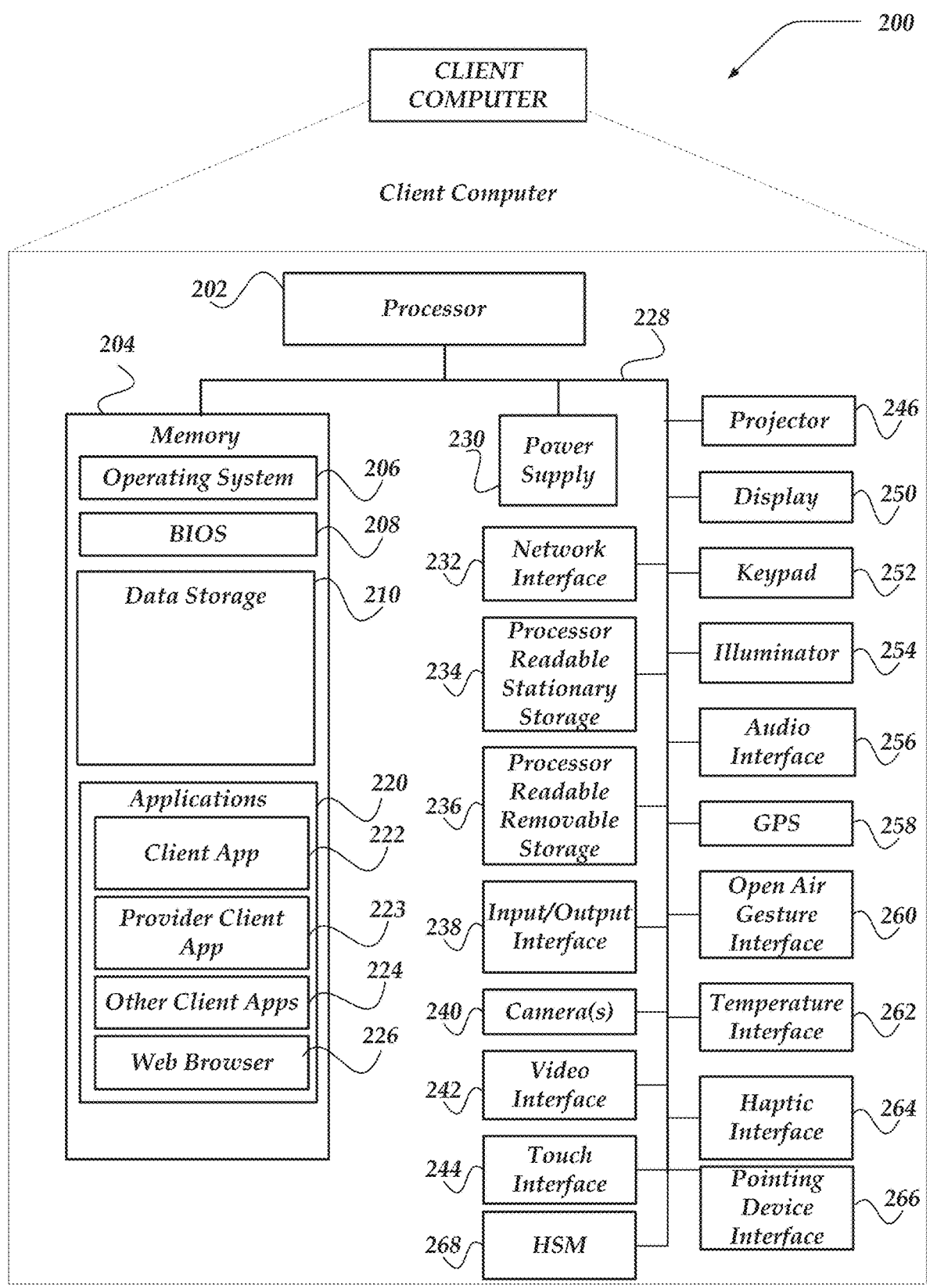
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, customer client application 222, provider client application 223, other client applications 224, web browser 226, or the like. Client computers may be arranged to exchange communications, such as, queries, searches, messages, notification messages, event messages, calendar information, alerts, log data, API calls, or the like, combination thereof, with servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
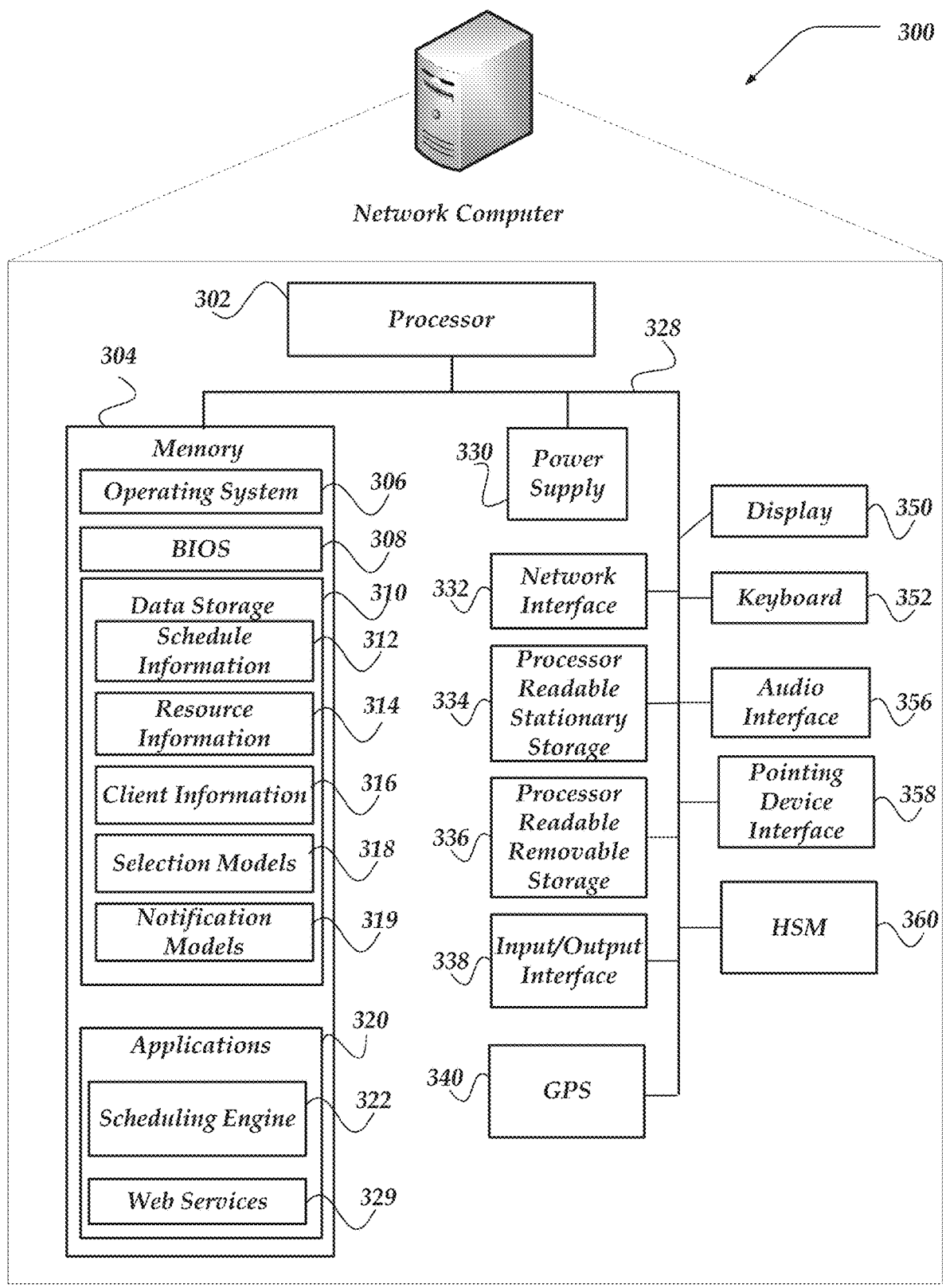
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of schedule management server computer 116 or service provider server computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, scheduling engine 322, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, schedule information 312, resource information 314, customer information 316, selection models 318, notification models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include scheduling engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, scheduling engine 322, web services 329, or the like, may be operative in a cloud-based computing environment. In one or more of the various embodiments, these applications, and others, that comprise a network monitoring computer may be executing within virtual machines or virtual servers that may be managed in a cloud based computing environment.

In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to scheduling engine 322, web services 329 or the like, may be provisioned and de-commissioned automatically.

Also, in one or more of the various embodiments, scheduling engine 322, web services 329, or the like, may be located in virtual servers running in a cloud-based computing environment rather than being tied to one or more specific physical network computers. Likewise, in some embodiments, one or more of scheduling engine 322, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
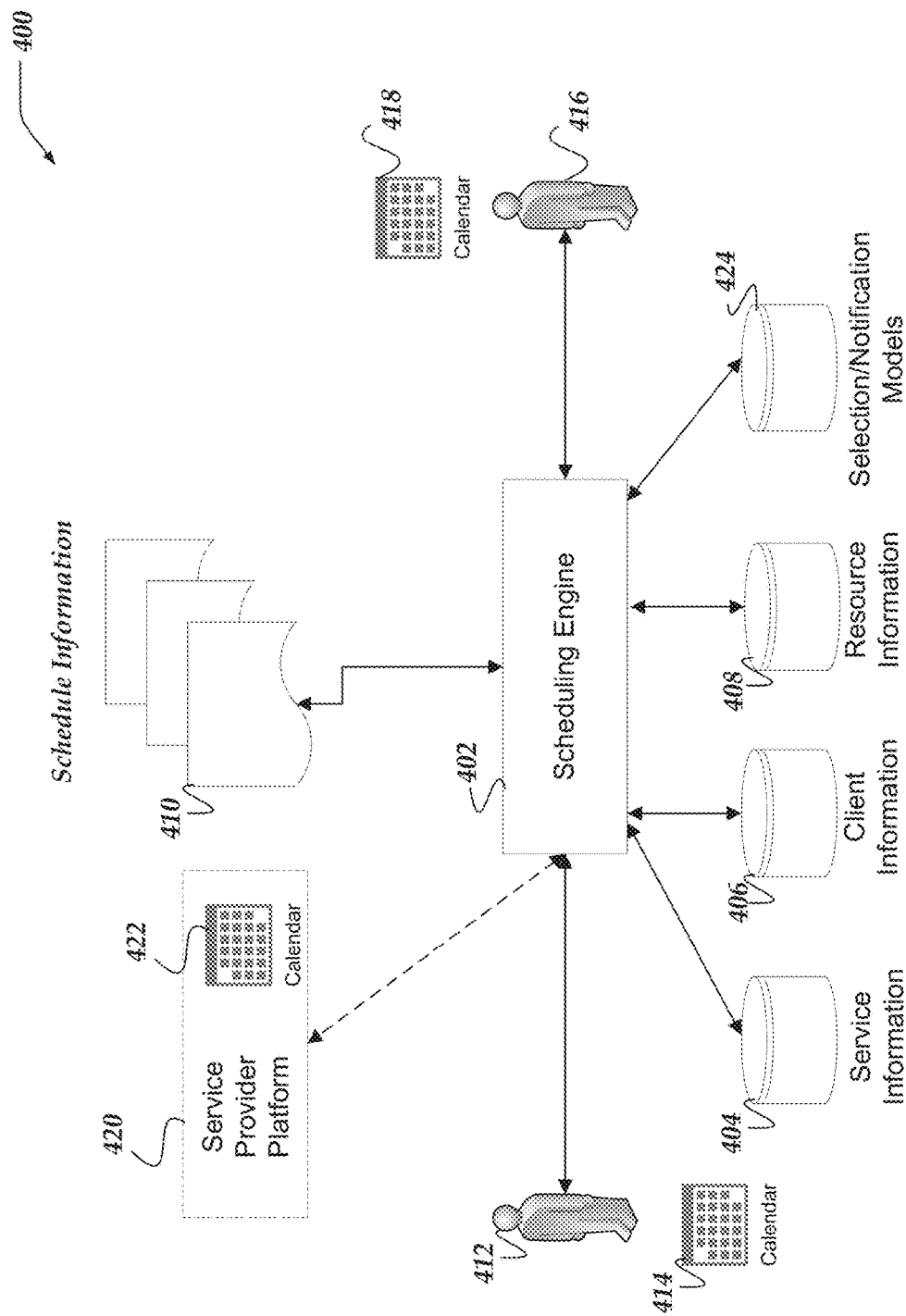
FIG. 4 illustrates a logical architecture of a system for availability based resource scheduling in accordance with one or more of the various embodiments.

FIG. 4 illustrates a logical architecture of system 400 for availability based resource scheduling in accordance with one or more of the various embodiments. In one or more of the various embodiments, system 400 may be hosted or executed by one or more network computers, such as, schedule management server computer 116, or the like. In one or more of the various embodiments, system 400 may include: scheduling engine 402, service information 404, client information 406, resource information 408, schedule information 410, resources/providers 412, provider calendars 414, clients 416, client calendars 418, service provider platform 420, service provider platform calendars 422, selection/notification models 424, or the like.

In some embodiments, service provider organizations may be required to use appointment scheduling to efficiently and conveniently allocate resources or providers to clients. This may enable service providers and clients to determine time slots that may be mutually available or otherwise convenient. Naturally, organizations try to set appointments that utilize their resources or providers. Ideally, if providers and clients mutually agree upon an appointment time, resources or providers may be allocated or utilized effectively.

Unfortunately, it is not uncommon for clients to cancel appointments, sometimes at the last minute. Often, service providers may employ various conventional methods to discourage clients from making last minute cancellations such as cancellation fees, or the like. However, cancellation fees rarely compensate for the lost revenue or lost opportunity, especially if the providers associated with canceled appointments cannot be rescheduled with another client for the same appointment slot. Often, organizations may attempt to schedule other clients to fill canceled appointments. However, refilling canceled appointments may be difficult because identifying clients that may be available or willing to take an appointment with little notice may be time consuming or labor intensive and costly, and may not result in a high rate of filling canceled appointments. Rescheduling the client who canceled the appointment and filling the cancelled appointment with a new client is typically performed manually at significant cost and with unreliable and marginal success. Moreover, in many cases, to address the frequency of canceled appointments, organizations often over-book appointments so that assigned resources will be able to provide services, even assuming a significant percentage of cancellations. That method of addressing the frequency of appointment cancellations often results in a decrease in client satisfaction and organizational morale as resources are over-assigned resulting in poor service and resource fatigue One or more of the embodiments contemplated herein may provide a rapid automated system for communicating appointment cancellations to a high volume of clients eligible for open appointments and for selecting and confirming the appointment with a new client via broadcast or serial notifications which communication delivery priority and methods can be tailored by the organization on a case by case basis with minimal organizational resources. In addition, clients who cancel appointments, upon cancellation, are able to indicate their availability for a new appointment, and the system allows said clients to be immediately notified and confirm appointments based on said client's appointment eligibility and the availability of organizational resources.

Accordingly, in one or more of the various embodiments, scheduling engines, such as, scheduling engine 402 may be arranged to enable service providers to rapidly or efficiently refill canceled appointments. In some embodiments, scheduling engines may be arranged to employ information, such as, service information 404, client information 406, resource information 408, organization, or the like, to identify or notify qualified clients that may be willing to refill the appointment slot. Thus, in some embodiments, if other clients accept canceled appointments, the unassigned resources or providers may be utilized to service the clients that refill the canceled appointments.

In some embodiments, service information 404 may represent a data store that includes information about the services associated with appointments. In some embodiments, such information may include, codes, descriptions, labels, as well as criteria for determining qualified clients or eligible providers. Also, in some embodiments, other restrictions or criteria that may influence appointment scheduling, such as, hours of operation, location, or the like.

In one or more of the various embodiments, client information 406 may represent a data store that includes information about clients that may be available. In some embodiments, client information may include demographics, name, address, scheduling preferences (e.g., favored times or days), notification preferences (e.g., blackout periods, do-not-disturb rules, or the like), favored or assigned providers, or the like.

In one or more of the various embodiments, resource information 408 may represent a data store that includes information about resources or providers that may be associated with appointments or canceled appointments. In some embodiments, this information may include, services offered, specialties, certifications, availability, locations, price/cost, or the like.

Accordingly, in one or more of the various embodiments, scheduling engines may be arranged to evaluate information associated with canceled appointments, providers, or clients to determine how or if an appointment may be refilled.

In one or more of the various embodiments, scheduling engines may be arranged to employ calendar information to determine if clients may be qualified for refilling appointments. In some embodiments, scheduling engines may be arranged to compare calendars of clients or providers to determine if an appointment may be refilled.

In one or more of the various embodiments, scheduling engines may be arranged to integrate with one or more service provider platforms to exchange or share provider information, client information, service information, calendars/schedules, appointment information, or the like. Note, in this example, service provider platform 420 is illustrated with dashed lines because in some embodiments integrating with a service provider platform may be optional because in some embodiments providers or clients may work directly with a schedule management platform that may be separate or independent from a service provider platform.

Accordingly, in some embodiments, scheduling engines may be arranged to generate internal representations of schedules or schedule information, such as, schedule information 410 that may be employed for refilling canceled appointments.

In one or more of the various embodiments, scheduling engines may be arranged to employ one or more selection models to select qualified clients for an open appointment. In some embodiments, selection models may be considered data structures that include heuristics, classifiers, rules, instructions, or the like, that may be employed to determine qualified clients from the corpus of known clients. In some embodiments, selection models may be generated or modified by scheduling engines based on various inputs, rules, or the like. In some embodiments, schedule management platforms may be arranged to provide one or more user interfaces that enable users to provide or define input information that may be employed to generate selection models that may be used to determine one or more qualified clients.

Also, in one or more of the various embodiments, scheduling engines may be arranged to employ one or more notification models to determine how to notify qualified clients about open appointments. In some embodiments, notification models may be considered data structures that include heuristics, classifiers, rules, instructions, or the like, that may be employed to determine various notification actions, such as, serial notifications, broadcast notifications, notification order, notification methods, acceptance timeouts, confirmation timeouts, or the like.

Figure 5:
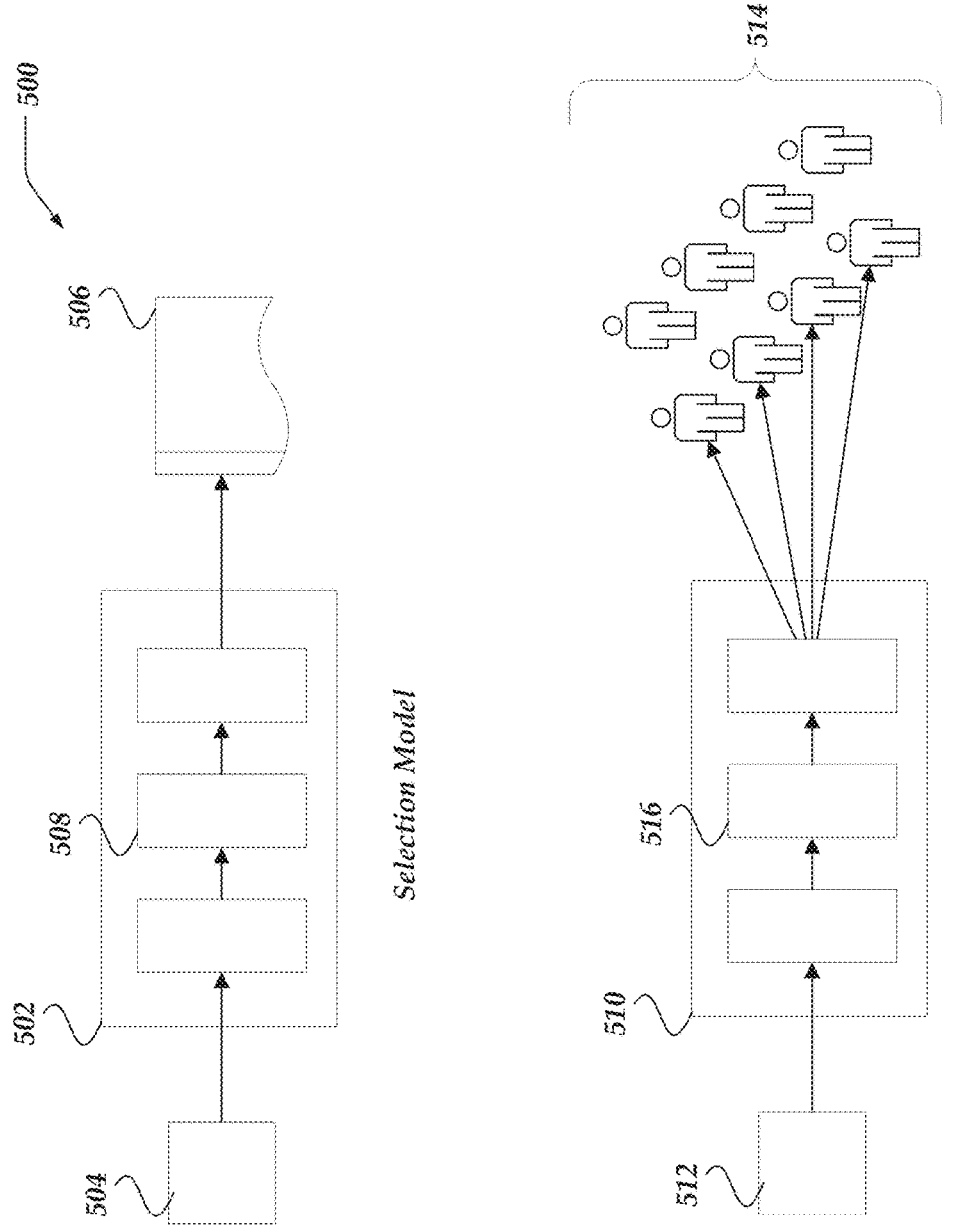
FIG. 5 illustrates a logical schematic of a portion of a scheduling engine showing selection models and notification models for availability based resource scheduling in accordance with one or more of the various embodiments.

FIG. 5 illustrates a logical schematic of a portion of scheduling engine 500 showing selection models and notification models for availability based resource scheduling in accordance with one or more of the various embodiments.

In some embodiments, scheduling engines may be arranged to employ selection models, such as, selection model 502 to select qualified clients for a given open appointment. As described above, selection models may encapsulate various rules, instructions, classifiers, or the like. In some embodiments, the particular components or configuration of a selection model may vary depending on local requirements or local circumstances. In some embodiments, scheduling engines may be arranged to employ different selection models for different types of appointments, resources, organizations, or the like. Accordingly, in some embodiments, scheduling engines may be arranged to employ rules, instructions, conditions, or the like provided via configuration information to determine which selection model should be used.

In some embodiments, selection models may be arranged to accept inputs, such as, information about open appointments, information about unassigned resources or providers, or the like. In some embodiments, selection models may be arranged to process the inputs to determine how to select qualified clients. In some embodiments, rules, libraries, or the like, for selection qualified clients may be encapsulated in selection models. In this example, component 508, or the like, represent the internal implementation of selection model 502. Note, while the illustration of this example may resemble a pipeline architecture, these innovations are not so limited because other solutions or architectures may be employed as well.

In this example, for some embodiments, scheduling engines may be arranged to provide input information 504 to selection model 502. Accordingly, in some embodiments, one or more parts of selection model 502, such as, component 508 may evaluate input information 504 to generate queries, filters, or the like, to generate the selected qualified clients. In some embodiments, selection models may be arranged to provide a query string, or the like, that scheduling engines may provide to database management systems to determine the qualified clients. In some embodiments, selection models may be configured to interface with one or more data stores or databases such that they may provide the qualified clients (qualified clients 506) or references thereto rather than providing a query string or other intermediate output.

In one or more of the various embodiments, scheduling engines may be arranged to generate selection models on the fly based on information associated with open appointments, organizational preferences, provider preferences, or the like. In some embodiments, one or more components may be included in a selection model based on the type appointment, resources, or clients associated with open appointments. In some embodiments, schedule management platforms may be arranged to provide user interface that enable users (e.g., schedule administrators) to dynamically generate or modify selection models that may be used for determining qualified clients. For example, in some embodiments, user interfaces may enable users to add or remove filter, set conditions or criteria, define pattern matching rules (regular expressions), or the like, that may be included in customized selection model.

Also, in some embodiments, scheduling engines may be arranged to employ notification models, such as, notification model 510 to determine how to manage providing invitations to accept open appointments to qualified clients. As described above, notification models may encapsulate the various heuristics, rules, conditions, classifiers, or the like, used for managing notifications. In some embodiments, the particular components or configuration of a notification model may vary depending on local requirements or local circumstances. In some embodiments, scheduling engines may be arranged to employ different notification models for different types of appointments, resources, clients, organizations, or the like. Accordingly, in some embodiments, scheduling engines may be arranged to employ rules, instructions, conditions, or the like, provided via configuration information to determine which notification model should be used.

In some embodiments, notification models may be arranged to accept inputs, such as, information about the open appointment, information about unassigned resources or providers, information about qualified clients being notified, or the like. In some embodiments, notification models may be arranged to process the inputs to determine how to notify qualified clients. Also, in some embodiments, notification models may determine policy level actions or conditions, such as, acceptance timeouts, confirmation timeouts, serial notification, broadcast notification, or the like.

In some embodiments, the instructions, rules, libraries, or the like, for determining how to process notifications may be encapsulated in notification model 510. In this example, component 516, or the like, represents the internal implementation of notification model 510. Note, while the illustration of this example may resemble a pipeline architecture, these innovations are not so limited. Other, solutions or architectures may be employed as well.

In this example, for some embodiments, scheduling engines may be arranged to provide input information 512 to notification model 510. Accordingly, in some embodiments, one or more parts of notification model 510, such as, component 516 may evaluate input information 512 to determine how to notify one or more qualified clients, such as qualified clients 514.

In one or more of the various embodiments, notification models may be arranged to enable one or more progressive notification policies that dynamically determine one or more communication modes for providing invitations to accept open appointments. In some embodiments, scheduling engines may be arranged to maintain historical logs or records associated with prior success or failure of a given communication mode. Accordingly, in some embodiments, a may be arranged to prefer communication modes that have been successful in the past over communication modes that have had less success.

In some embodiments, notification models may be arranged to prefer one communication mode over another based on various criteria, such as, success history, user/client/provider preference, cost, load balancing, or the like. Accordingly, in some embodiments, scheduling engines may be arranged to select or configure notification models based on rules, conditions, criteria, or the like, provided via configuration information to account for local requirements or local circumstances.

Generalized Operations

FIGS. 6-12 represent generalized operations for availability based resource scheduling in accordance with one or more of the various embodiments. In one or more of the various embodiments, processes 600, 700, 800, 900, 1000, 1100, and 1200 described in conjunction with FIGS. 6-11 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 6-12 may be used for availability based resource scheduling in accordance with at least one of the various embodiments or architectures such as those described in conjunction with FIG. 4 or FIG. 5. Further, in one or more of the various embodiments, some or all of the actions performed by processes 600, 700, 800, 900, 1000, 1100, and 1200 may be executed in part by scheduling engine 322, or the like, running on one or more processors of one or more network computers.

Figure 6:
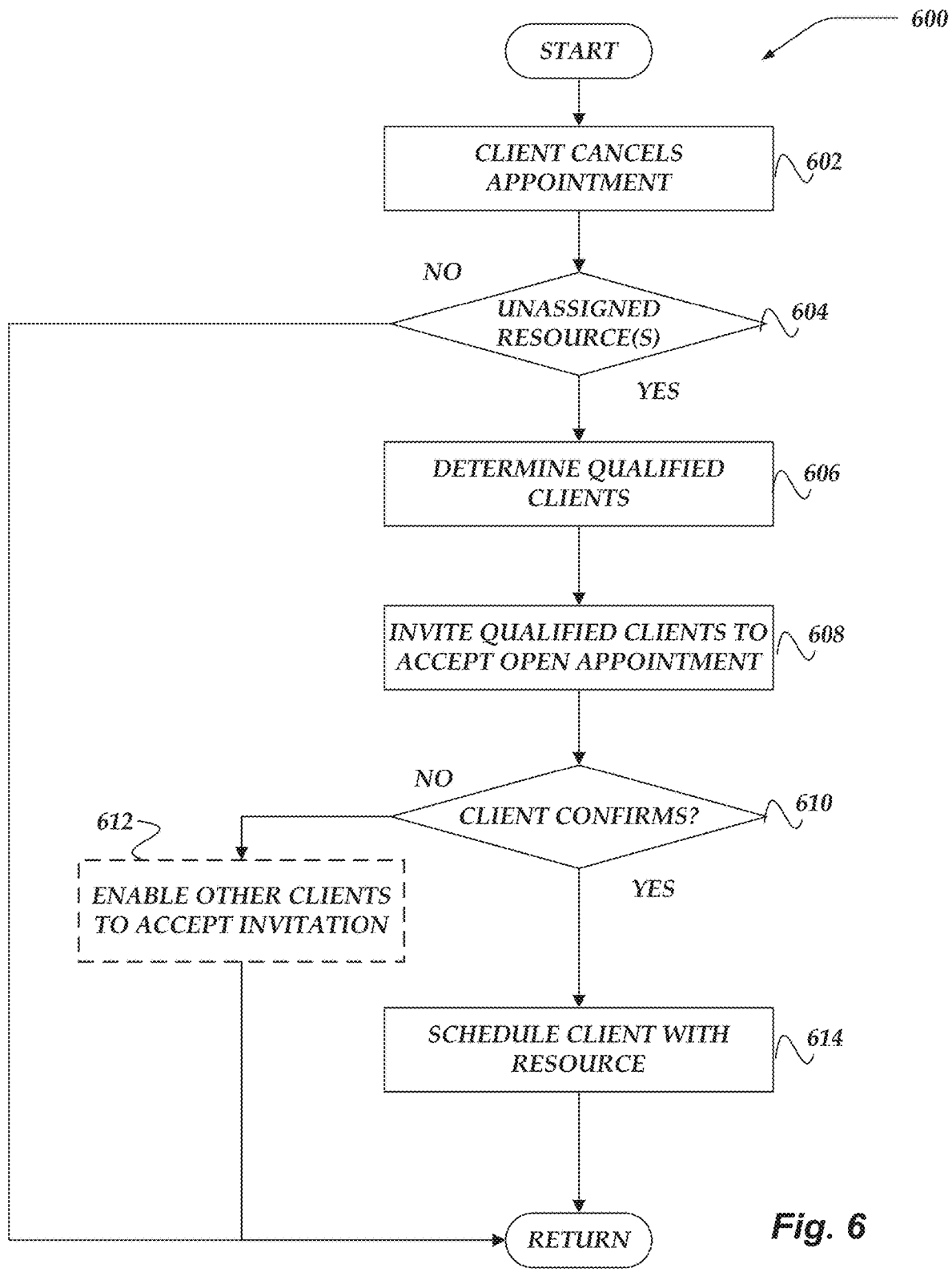
FIG. 6 illustrates an overview flowchart of a process for availability based resource scheduling in accordance with one or more of the various embodiments.

FIG. 6 illustrates an overview flowchart of process 600 for availability based resource scheduling in accordance with one or more of the various embodiments. After a start block, at block 602, in one or more of the various embodiments, one or more clients may cancel previously scheduled appoints. In one or more of the various embodiments, canceled appointments may be considered open appointments. In some embodiments, clients may be enabled to cancel appointments using a variety of methods depending on the organization or provider associated the appointment. In some embodiments, one or more clients that cancel appointments may be immediately eligible for re-scheduling with the same or different provider. For example, for some embodiments, clients may be enabled to cancel appointments using web applications, mobile applications, email, text messages, telephonic requests, interactive voice response systems, in person, or the like.

In some embodiments, schedule management platforms may be arranged to provide user interfaces that enable clients to cancel appointments directly. In other embodiments, the appointments may be canceled independent from the schedule management platform. Accordingly, in some embodiments, users or other services may provide appointment cancellation information to a schedule management platform.

At decision block 604, in one or more of the various embodiments, if there may be unassigned resources because of the canceled appointments, control may flow to block 606; otherwise, control may be returned to a calling process. In some cases, for some embodiments, a canceled appointment may not result in unassigned resources. For example, for some embodiments, if the resources have already been reassigned or if they were over-subscribed, the canceled appointments may not result in unassigned resources.

In one or more of the various embodiments, scheduling engines integrated with the scheduling system of an organization may be arranged to automatically determine if the cancellation results in unassigned resources. Alternatively, in one or more of the various embodiments, scheduling engines may be arranged to provide user interfaces that enable users (e.g., scheduling administrators) to identify unassigned resources.

Also, in one or more of the various embodiments, scheduling engines may be arranged to provide one or more user interfaces that enable providers to indicate that they are unassigned or otherwise underutilized. For example, in some embodiments, a provider that becomes unexpectedly available may indicate that they are now available to accept last minute appointments. Thus, in some embodiments, in some cases, unassigned resources may become available in the absence of canceled appointments.

At block 606, in one or more of the various embodiments, scheduling engines may be arranged to determine one or more qualified clients. In one or more of the various embodiments, scheduling engines may be arranged to query its client data store to determine if there may be one or more clients that may qualify for filling open appointments. In some embodiments, the criteria for determining the qualified clients may vary depending on the unassigned providers, or other resources that may be available.

In one or more of the various embodiments, the rules or policy for determining qualified clients may vary depending on various factors, such as, the organizations, the types of appointments, the associated unassigned providers, the services requested by clients, or the like. Accordingly, in some embodiments, scheduling engines may be arranged to employ selection models to determine qualified clients.

At block 608, in one or more of the various embodiments, scheduling engines may be arranged to notify the one or more qualified clients. In one or more of the various embodiments, scheduling engines may be arranged to employ one or more communication modes to notify qualified clients that open appointments may be available.

In one or more of the various embodiments, scheduling engines may be arranged to employ various distribution methods or strategies to notify candidate clients. In some embodiments, scheduling engines may be arranged to broadcast notifications at the same time to some or all of the qualified clients. Also, in some embodiments, scheduling engines may be arranged to send notifications serially to some or all of the qualified clients. In some embodiments, the determination of which notification strategy to employ may vary depending on the open appointment, the unassigned resources, or the like. Accordingly, in some embodiments, scheduling engines may be arranged to employ notification models to determine how invitations to accept open appointments may be provided to qualified clients.

In one or more of the various embodiments, the rules or policy for determining how to notify qualified clients may vary depending on various factors, such as, the organizations, the types of appointments, the associated unassigned providers, client location, custom preferences, the services requested by clients, or the like. Accordingly, in some embodiments, scheduling engines may be arranged to employ notification models to determine qualified clients.

At decision block 610, in one or more of the various embodiments, if candidate clients accept and confirm the appointments associated with the notifications, control may flow to block 614; otherwise, control may flow to block 612. In one or more of the various embodiments, clients that accept the open appointment and subsequently confirm their acceptance may be assigned to the open appointment.

In some embodiments, scheduling engines may be arranged to enable the first qualified client that accepts an open appointment to reserve the appointment for a limited time until the client confirms their acceptance. Accordingly, in some embodiments, the accepting client can reserve the open appointment before conferring with others to ensure that they can make the appointment. In some embodiments, if the client that accepts an appointment does not confirm their acceptance before the confirmation timeout expires, they will lose their reservation of the open appointment enabling other clients to accept (reserve) the open appointment.

At block 612, in one or more of the various embodiments, optionally, scheduling engines may be arranged to enable other clients to accept the open appointments. In one or more of the various embodiments, if there may be open appointments, scheduling engines may be arranged to perform one or more actions to seek other qualified clients that may be willing to accept and confirm the open appointments. The particular actions may vary depending on the type of notification, the open appointment, the unassigned resources, organization policy, provider preferences, or the like. In some embodiments, scheduling engines may be arranged to employ selection models or notification models to determine the specific actions to perform to enable other clients to accept open appointments.

At block 614, in one or more of the various embodiments, scheduling engines may be arranged to schedule the client with the open appointment, closing the appointment by associating the confirming qualified client and the relevant unassigned resources with the appointment.

Next, in one or more of the various embodiments, control may be returned to a calling process.

Figure 7:
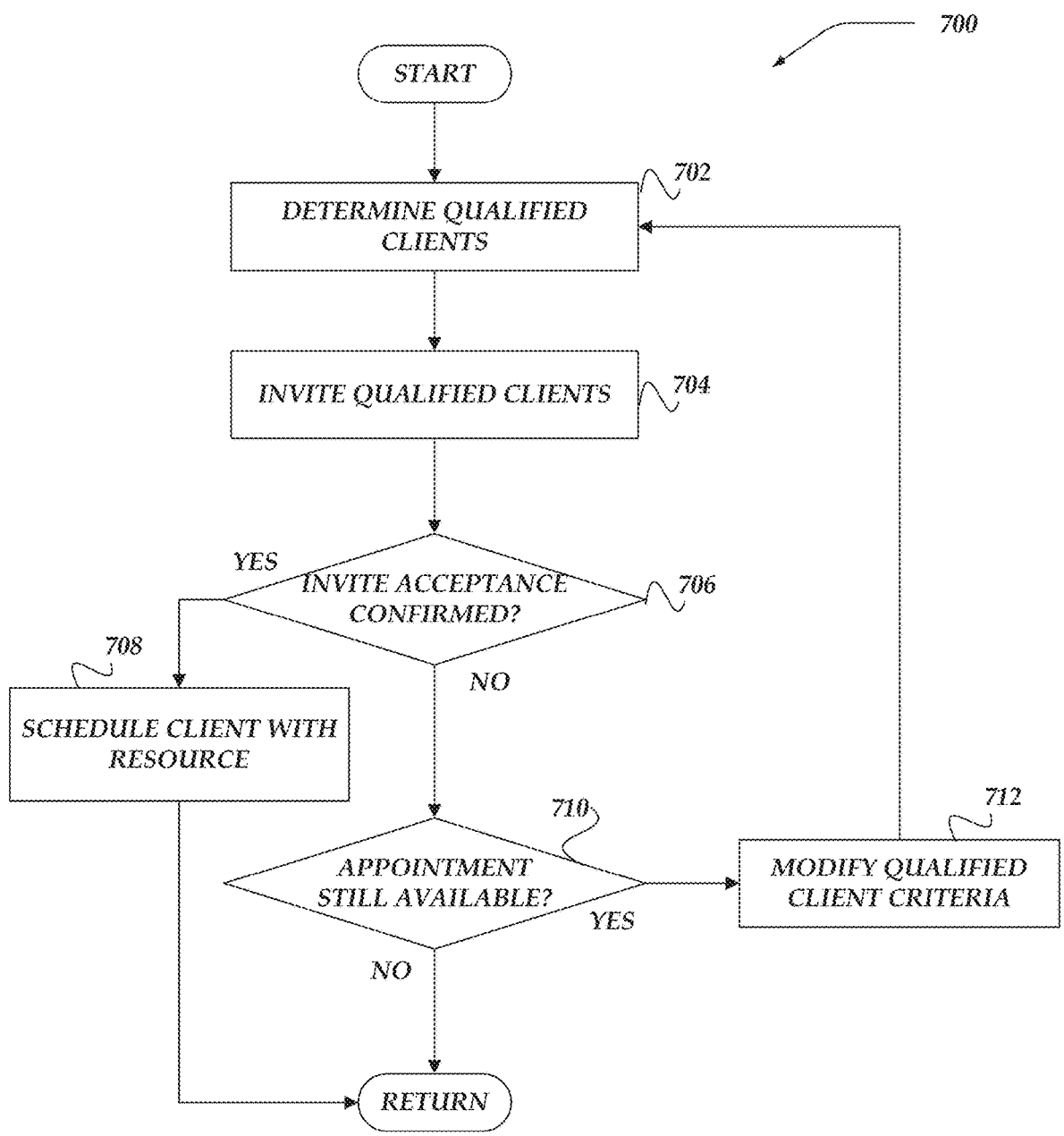
FIG. 7 illustrates a flowchart of a process for filling open appointments using availability based resource scheduling in accordance with one or more of the various embodiments.

FIG. 7 illustrates a flowchart of process 700 for filling canceled appointments using availability based resource scheduling in accordance with one or more of the various embodiments. After a start block, at block 702, in one or more of the various embodiments, a scheduling engine may be arranged to determine one or more qualified clients to refill the canceled appointment.

In one or more of the various embodiments, scheduling engines may be arranged to enable clients, providers, organizations, or the like, to establish preferences, criteria, conditions, rules, or the like, that may be employed to determine qualified clients for an open appointment. Accordingly, in some embodiments, scheduling engines may be arranged to generate one or more selection models to determine qualified clients based on preferences, criteria, conditions, rules, or the like, provided by clients, providers, organizations, or the like. In some embodiments, one or more selection models or portions of selection model may be stored or cached for reuse. In some embodiments, one or more selection models may be based on selection model templates that define some or all selection actions or selection criteria.

In one or more of the various embodiments, scheduling engines may be arranged to employ the selection models to generate or provide a query to one or more client information data stores. In some embodiments, the results of the query may include the qualified clients, references to qualified clients, or identifiers corresponding to qualified clients. In some embodiments, the format or contents of the query may vary depending on the criteria used to determine qualified clients or the underlying data source. Accordingly, in some embodiments, scheduling engines may be arranged to employ rules, criteria, conditions, or the like, provided via configuration information to determine the query to account for local circumstances or local requirements. In some embodiments, some or all of these rules, criteria, conditions, or the like, may be provided via a selection model.

In one or more of the various embodiments, scheduling engines may be arranged to sort or rank order qualified clients based on the some or all of the criteria used to select them. Further, in some embodiments, scheduling engines may be arranged to enable organizations to offer priority scheduling options for clients. For example, in some embodiments, an organization may enable clients to pay a monthly premium to ensure that they may be notified of certain open appointments before other clients. In one or more of the various embodiments, the particular sorting or ranking actions may be provided or determined based on a selection model.

In one or more of the various embodiments, scheduling engines or schedule management platforms may be arranged to provide user interfaces that enable users to dynamically generate selection models for determining qualified clients. In some embodiments, user interfaces may be arranged to enable one or more users to select some or all of the criteria, rules, or conditions that may be employed to determine qualified clients. In some embodiments, scheduling engines may be arranged to enable such users to provide various search terms, conditions, filters, or the like, that may be used to dynamically generate or modify selection models that may determine qualified clients that may be selected or prioritized for notification.

At block 704, in one or more of the various embodiments, the scheduling engine may be arranged to invite the one or more qualified clients to accept to open appointments. In one or more of the various embodiments, schedule management platforms may be arranged to support a variety of communication modes or facilities, such as, mobile telephone push notifications, email, text messages, mobile/desktop application notifications, interactive voice response systems, or the like.

In one or more of the various embodiments, scheduling engines may be arranged to determine the communication mode for providing invitations based on various criteria, such as, client preference, provider preference, organization preference, qualified client location/status, or the like. Likewise, in some embodiments, scheduling engines may be arranged to employ more than one communication mode for the same open appointment, provider, or qualified client, or the like. Accordingly, in some embodiments, scheduling engines may be arranged to determine the one or more invitation methods based on rules, conditions, criteria, or the like, provided via configuration information. In some embodiments, scheduling engines may be arranged to determine notification policy or notification methods based on a notification model.

At decision block 706, in one or more of the various embodiments, if the appointments may be confirmed by qualified clients, control may flow to block 708; otherwise, control may flow to decision block 710. As described above, qualified clients invited to accept an open appointment may be required to accept the open appointment and then confirm that they will take the open appointment. In some cases, scheduling engines may be arranged to enable qualified clients to accept and confirm an open appointment in one action. However, in some embodiments, scheduling engines may be arranged to enable qualified clients to accept an appointment to initially reserve it for a limited period of time until the qualified client confirms their acceptance of the open appointment.

At block 708, in one or more of the various embodiments, the scheduling engine may be arranged to schedule the open appointment with the qualified client that confirmed that they will take the appointment. Next, in one or more of the various embodiments, control may be returned to a calling process.

At decision block 710, in one or more of the various embodiments, if the appointments remain available or open, control may flow to block 712; otherwise, control may be returned to a calling process. In one or more of the various embodiments, scheduling engines may be arranged to monitor if an open appointment remains open. In some embodiments, the open appointment may expire before a qualified client confirms their acceptance. For example, for some embodiments, the time window or time slot of the open appointment may pass before a qualified client confirms their acceptance. In this example, the open appointment would be automatically closed.

At block 712, in one or more of the various embodiments, the scheduling engine may be arranged to modify the criteria for selecting qualified clients. In some embodiments, because the open appointment remains available, scheduling engines may be arranged to determine or re-prioritize the qualified clients for the open appointment. As described herein, scheduling engines may be arranged to employ one or more criteria to identify, select, or filter clients to determine qualified clients. Accordingly, in one or more of the various embodiments, modifying the selection criteria may modify which candidate clients may be available.

In one or more of the various embodiments, scheduling engines may be arranged to employ selection models that provide one or more rules that may automatically progressively modify client selection criteria to automatically expand the number of qualified clients that may be available for an open appointment. For example, for some embodiments, scheduling engines may employ selection models that expand the geographic range to identify qualified clients as open appointments remain unfilled. Also, for example, scheduling engines may be configured to modify the criteria for qualified clients to include clients that are already scheduled for later appointments in case they would like to change their later scheduled appointment to open appointment. Thus, in this example, if a scheduled client accepts the closer-in-time open appointment, the organization may have more time to fill the appointment being vacated while filling the open appointment before its time window passes.

Next, in some embodiments, control may loop back to block 702.

Figure 8:
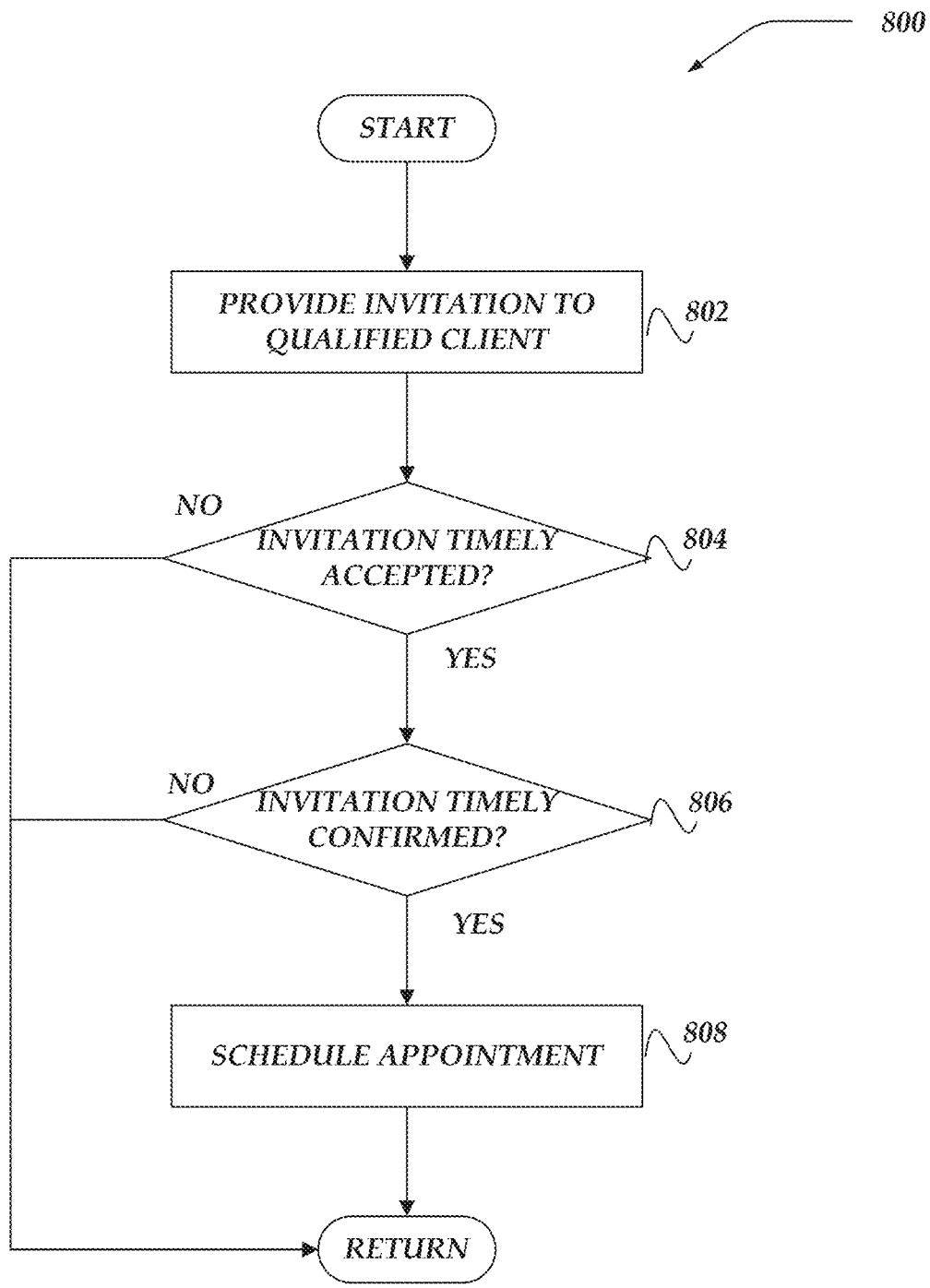
FIG. 8 illustrates a flowchart of a process for providing invitation to accept open appointments to qualified clients for availability based resource scheduling in accordance with one or more of the various embodiments.

FIG. 8 illustrates a flowchart of process 800 for providing invitations to accept open appointment to qualified clients for availability based resource scheduling in accordance with one or more of the various embodiments. After a start block, at block 802, in one or more of the various embodiments, a scheduling engine may be arranged to provide one or more notifications to qualified clients that include an invitation to accept an open appointment. As described above, scheduling engines may be arranged to employ one or more communication modes to be determined by notification models to provide notifications to qualified clients. In some embodiments, scheduling engines may be arranged to employ broadcast notification such that each qualified client may be notified of the available appointment at the same time. Accordingly, in some embodiments, the first client that accepts and the confirms their acceptance of the appointment may be associated with the appointment.

At decision block 804, in one or more of the various embodiments, if the appointment may be timely accepted, control may flow decision block 806; otherwise, control may be returned to a calling process. In one or more of the various embodiments, scheduling engines may be arranged to include instructions, links, user interfaces, or the like, with invitations to enable candidate clients to accept open appointments.

In one or more of the various embodiments, scheduling engines may be arranged to reserve an open appointment for the accepting client for a limited time.

Also, in one or more of the various embodiments, scheduling engines may be arranged to associate an acceptance timeout with one or more invitations. Thus, in some embodiments, qualified clients that receive an invitation to accept an open appointment may have a limited time to accept the invitation.

Accordingly, in some embodiments, scheduling engines may be arranged to determine invitation acceptance timeouts based on rules, conditions, timeout values, or the like, provided by notification models.

At decision block 806, in one or more of the various embodiments, if the acceptance of the invitation may be timely confirmed, control may flow to block 808; otherwise, control may be returned to a calling process. In one or more of the various embodiments, scheduling engines may be arranged to give qualified clients that accept invitations to open appointments a limited amount of time to confirm their acceptance of the appointment. Accordingly, in some embodiments, other qualified clients may be barred from accepting invitation to open appointments accepted by other users for the duration of the confirmation timeout period.

In one or more of the various embodiments, if the confirmation timeout expires, scheduling engines may be arranged to enable other qualified clients to accept the open appointment. In some embodiments, this may include redoing or refreshing some or all of the invitations associated with the open appointment. Likewise, in some embodiments, if the confirmation timeout expires, scheduling engines may be arranged to modify the qualified client criteria or otherwise re-determine the qualified clients for the open appointment based on one or more selection models.

At block 808, in one or more of the various embodiments, the scheduling engine may be arranged to schedule the appointment with the client that confirmed their acceptance of the appointment. In one or more of the various embodiments, scheduling engines may be arranged to close the open appointment by categorizing it as a scheduled appointment. In one or more of the various embodiments, this may include associating the confirming client and one or more unassigned resources with the appointment. Also, in some embodiments, scheduling engines may be arranged to provide notification to the resources/provider(s) or organizations associated with the appointment to inform them that the appointment is no longer an open appointment.

Next, in one or more of the various embodiments, control may be returned to a calling process.

Figure 9:
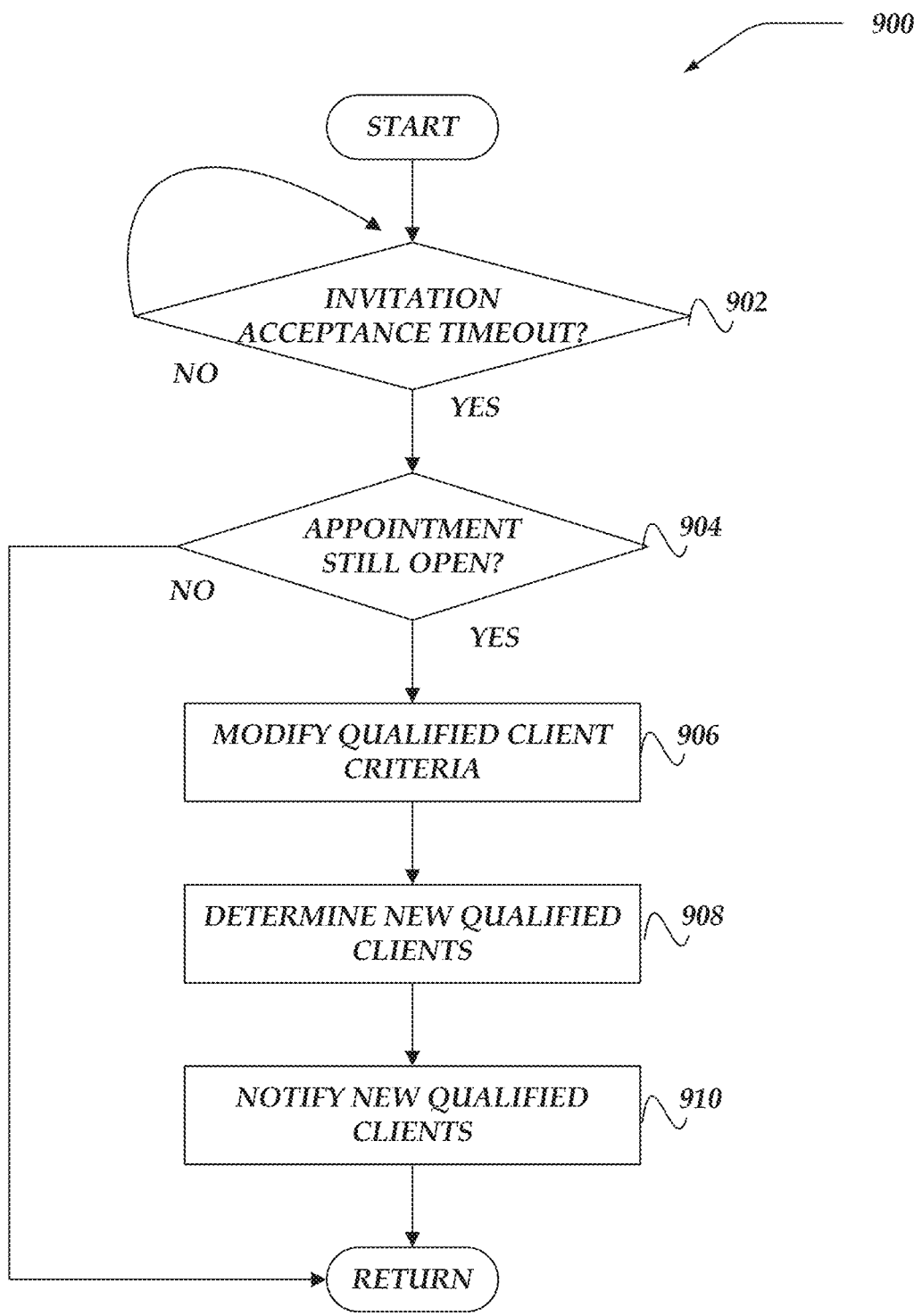
FIG. 9 illustrates a flowchart of a process for determining new qualified clients for open appointments that were not accepted for availability based resource scheduling in accordance with one or more of the various embodiments.

FIG. 9 illustrates a flowchart of process 900 for determining new qualified clients for appointments that were not accepted for availability based resource scheduling in accordance with one or more of the various embodiments. After a start block, at block 902, in one or more of the various embodiments, if the acceptance period for an appointment expires, control may flow to decision block 904; otherwise, control may loop back to decision block 904. In one or more of the various embodiments, if an open appointment remains unaccepted, none of the qualified clients that were provided invitations accepted the open appointment. In some embodiments, this may include qualified clients that failed to confirm their acceptance of an open appointment.

At decision block 904, if the appointment may still be open, control may flow to block 906; otherwise, control may be returned to a calling process. In one or more of the various embodiments, scheduling engines may be arranged to evaluate the schedule information associated with the open appointment to determine if the appointment remains available. Accordingly, in one or more of the various embodiments, scheduling engines may be arranged to consider one or more factors or criteria to determine if an open appointment remains open, such as, time-window, provider availability, resource availability, or the like. For example, if the open appointment is for 2:00 p.m. and it is now 1:45 p.m., scheduling engines may be configured to consider the unfilled appointment as unavailable. Likewise, for example, if the unassigned provider is now unavailable and substitute providers are unavailable, the appointment may be considered unavailable.

At block 906, in one or more of the various embodiments, the scheduling engine may be arranged to modify the qualified client criteria. As described above, scheduling engines may be arranged to automatically/progressively modify qualified client selection criteria based on rule, conditions, criteria, or the like, that may be included selection models. In some embodiments, scheduling engines may be arranged to notify organization representatives to inform them that the open appointment remains unscheduled. Accordingly, in some embodiments, the organization representatives may be enabled to access schedule management platform user interfaces to modify or review the selection models that determine the qualified client selection criteria.

At block 908, in one or more of the various embodiments, the scheduling engine may be arranged to determine one or more new qualified clients. In one or more of the various embodiments, scheduling engines may be arranged to generate or modify one or more selection models based on the modified criteria. In some embodiments, the generated or modified selection models may be employed to select one or more new qualified clients. In some embodiments, the new qualified clients may include qualified clients that were selected previously for the open appointment.

At block 910, in one or more of the various embodiments, the scheduling engine may be arranged to provide invitations to the one or more new qualified clients. As described herein, scheduling engines may be arranged to employ one or more notification models to generate or provide invitations to accept open appointments to one or more of the new qualified clients.

Next, in one or more of the various embodiments, control may be returned to a calling process.

Figure 10:
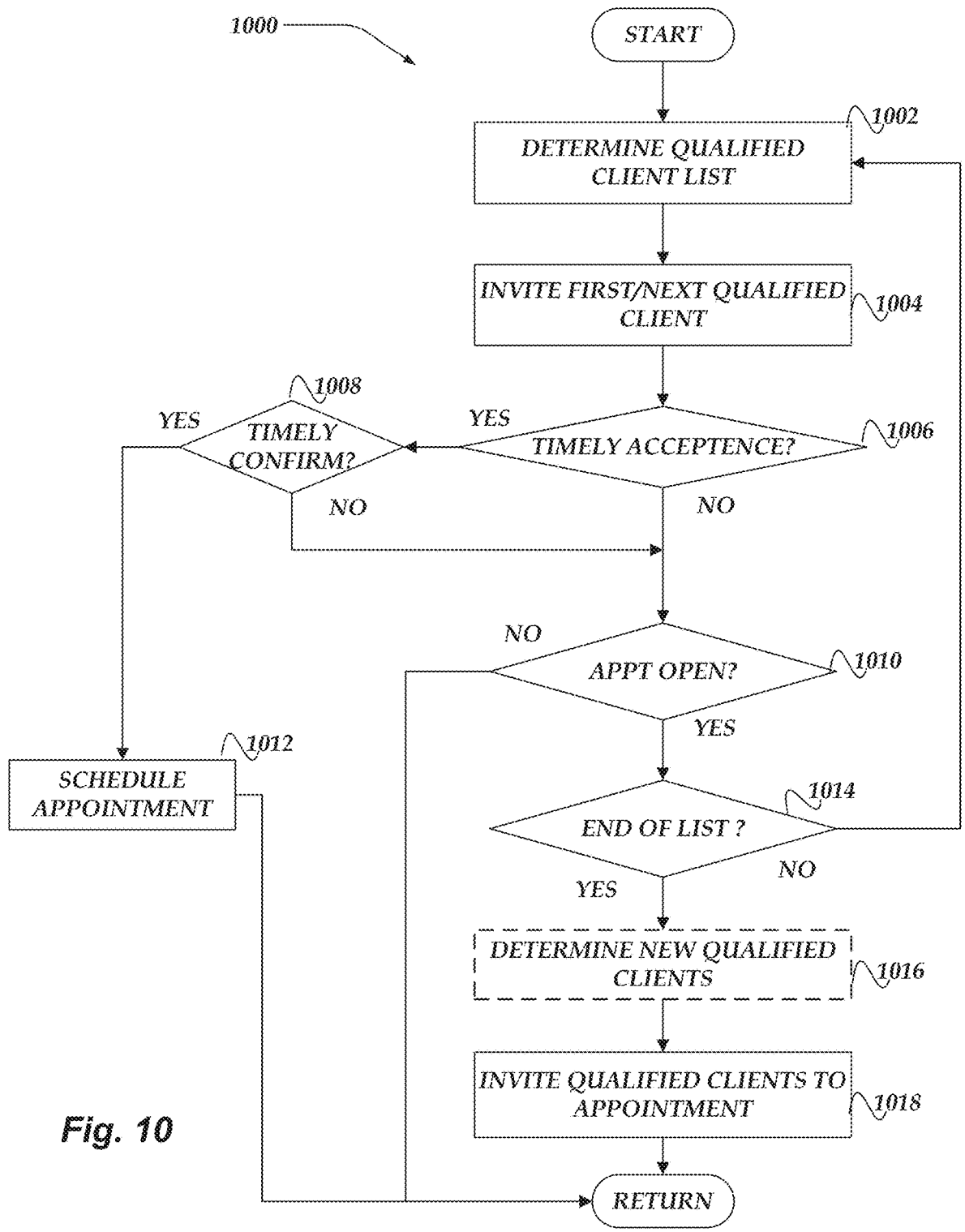
FIG. 10 illustrates a flowchart of a process for managing serially inviting qualified clients to accept open appointment for availability based resource scheduling in accordance with one or more of the various embodiments.

FIG. 10 illustrates a flowchart of process 1000 for managing serial notifications for availability based resource scheduling in accordance with one or more of the various embodiments. After a start block, at block 1002, in one or more of the various embodiments, a scheduling engine may be arranged to determine a qualified client list that includes one or more qualified clients.

As described herein, scheduling engines may be arranged to determine one or more qualified clients for an open appointment. In some embodiments, scheduling engines may be arranged to serially notify qualified clients about open appointments. Accordingly, in one or more of the various embodiments, scheduling engines may be arranged to employ selection models to sort or rank the qualified clients based on one or more criteria. In some embodiments, scheduling engines may be arranged to employ a list or other data structures to persist the list of qualified clients and its sort order.

At block 1004, in one or more of the various embodiments, the scheduling engine may be arranged to provide an invitation to a first/next qualified client. In one or more of the various embodiments, serial notification requires one or more clients to be invited to accept open appointments in turn based on their position in a qualified client list.

In some embodiments, scheduling engines performing serial notification may be arranged to invite one qualified client at a time to accept an open appointment. Also, in some embodiments, scheduling engines may be arranged to employ serial notification for a portion of the qualified clients and then employ broadcast notification for the remainder of the qualified clients unless one of the serially notified qualified clients confirms their acceptance of the open appointment. For example, in some embodiments, a scheduling engine may be configured to use serial notification for the first five qualified clients and then transition to broadcast notification for the remainder if the appointment remains open and available.

At decision block 1006, in one or more of the various embodiments, if the appointment may be timely accepted, control may flow decision block 1008; otherwise control may flow to decision block 1010. As described above, in some embodiments, notifications may be associated with an acceptance timeout/expiration value. Accordingly, in some embodiments, scheduling engines may be arranged to start a timer process that may be employed to determine if the acceptance period of a notification has expired.

In some embodiments, if a qualified client attempts to accept the appointment after the acceptance expiration time has passed, the scheduling engine may place the qualified client in the second position of the qualified client list. Accordingly, in some embodiments, qualified clients that indicate interest in the appointment can be prioritized even though their acceptance window has passed. However, in some embodiments, they may be penalized for late acceptance by being placed second on the qualified client list, rather than being allowed to immediately accept the appointment.

At decision block 1008, in one or more of the various embodiments, if the appointment may be timely confirmed, control may flow to block 1012; otherwise, control may flow to decision block 1010. In one or more of the various embodiments, scheduling engines may be arranged to trigger a confirmation timer that enables the accepting qualified client to conduct some additional investigation (e.g., checking in with family or employers to see if they can make the appointment) before confirming their acceptance. In some embodiments, if the accepting qualified client fails to confirm their acceptance before the expiry of the confirmation timeout, they may lose their reservation of the open appointment.

In some embodiments, if a client that accepted the appointment fails to confirm it timely, the scheduling engine may be arranged to position the client in the second position of the qualified client list. Thus, in some embodiments, even though the client failed to confirm their acceptance in time, they may be prioritized over other users.

At decision block 1010, in one or more of the various embodiments, if the appointment may remain open, control may flow to decision block 1014; otherwise, control may be returned to a calling process. In one or more of the various embodiments, this block may be reached if serially notified qualified clients fail to accept invitations to open appointments before the acceptance timeout expires or if they fail confirm accepted appointments before the expiration of the confirmation timeout.

Accordingly, in one or more of the various embodiments, scheduling engines may be arranged to determine the time window/slot for the open appointment has not passed. Also, in one or more of the various embodiments, scheduling engines may be arranged to confirm that the resources/providers for the appointment may remain available. In some embodiments, scheduling engines may be arranged to determine if an appointment is still available based on rules, conditions, criteria, or the like, provided via configuration information to account for local requirements or local conditions.

In some embodiments, one or more providers may require that open appointments are accepted a minimum time before the appointment time slot. Thus, in some cases, unfilled appointments may be abandoned even though their time windows have not passed. For example, for some embodiments, a provider may require appointments to be filled two hours before the appointment time slot to give them time to prepare.

At block 1012, in one or more of the various embodiments, the scheduling engine may be arranged to schedule the appointment with the client that confirmed the appointment. In one or more of the various embodiments, scheduling engines may be arranged to associate the confirming client with the appointment. In some embodiments, scheduling engines may be arranged to be configured to notify other providers, organizations, other clients, or the like, that the appointment may be filled. In some embodiments, scheduling engines may be arranged to enable organizations, providers, clients, or the like, to determine or select one or more post-scheduling notifications. Accordingly, in some embodiments, scheduling engines may be arranged to employ rules, conditions, or the like, provided via configuration information to account for local requirements or local circumstances. Next, in one or more of the various embodiments, control may be returned to a calling process.

At decision block 1014, in one or more of the various embodiments, if the end of the qualified client list may be reached, control may flow to block 1016; otherwise, control may loop back to block 1002. In some embodiments, the list of qualified clients includes the qualified clients that have been selected for serial notification. If qualified clients remain in the list, the next qualified client in the list may be selected for notification.

In some embodiments, if there is a client that accepted the appointment but failed to timely confirm their acceptance, that client may be placed in the second position of the remaining qualified client list. Thus, in some embodiments, the current next qualified client may receive the next notification and the client that accepted the invitation but failed to confirm their acceptance may be re-invited if the current next qualified client does not accept the appointment and confirm their acceptance of the appointment. Accordingly, in some embodiments, because the client has expressed interest by accepting the appointment but failed to confirm in time, they may be prioritized over other qualified clients except for the qualified client in the first position in the qualified client list.

At block 1016, in one or more of the various embodiments, optionally, the scheduling engine may be arranged to determine new qualified clients for the open appointment. In some embodiments, if the list of qualified clients requiring serial inviting has been exhausted, scheduling engines may be arranged to modify the qualified clients criteria or notification rules for the open appointment based on one or more selection models or one or more notification models.

Note, this block is indicated as optional because in some embodiments scheduling engines may be arranged to use the qualified clients determined in block 1002 rather than determining new qualified clients.

At block 1018, in one or more of the various embodiments, the scheduling engine may be arranged to provide invitations to clients in the determined qualified clients. In some embodiments, scheduling engines may be arranged to apply the same or different rules used for providing invitations to the initial list of qualified clients. For example, for some embodiments, scheduling engines may be arranged to broadcast notifications to the qualified clients rather than employing serial notifications. In some embodiments, the scheduling engines may be arranged to sequentially notify each qualified client in the serial notification list and if the appointment remains open and available, the scheduling engine may be configured to broadcast the notification to the same qualified clients in the list. In other circumstances, for other appointments, providers, or organizations, the scheduling engine may be arranged to generate another list of qualified clients and continue performing serial notifications.

Figure 11:
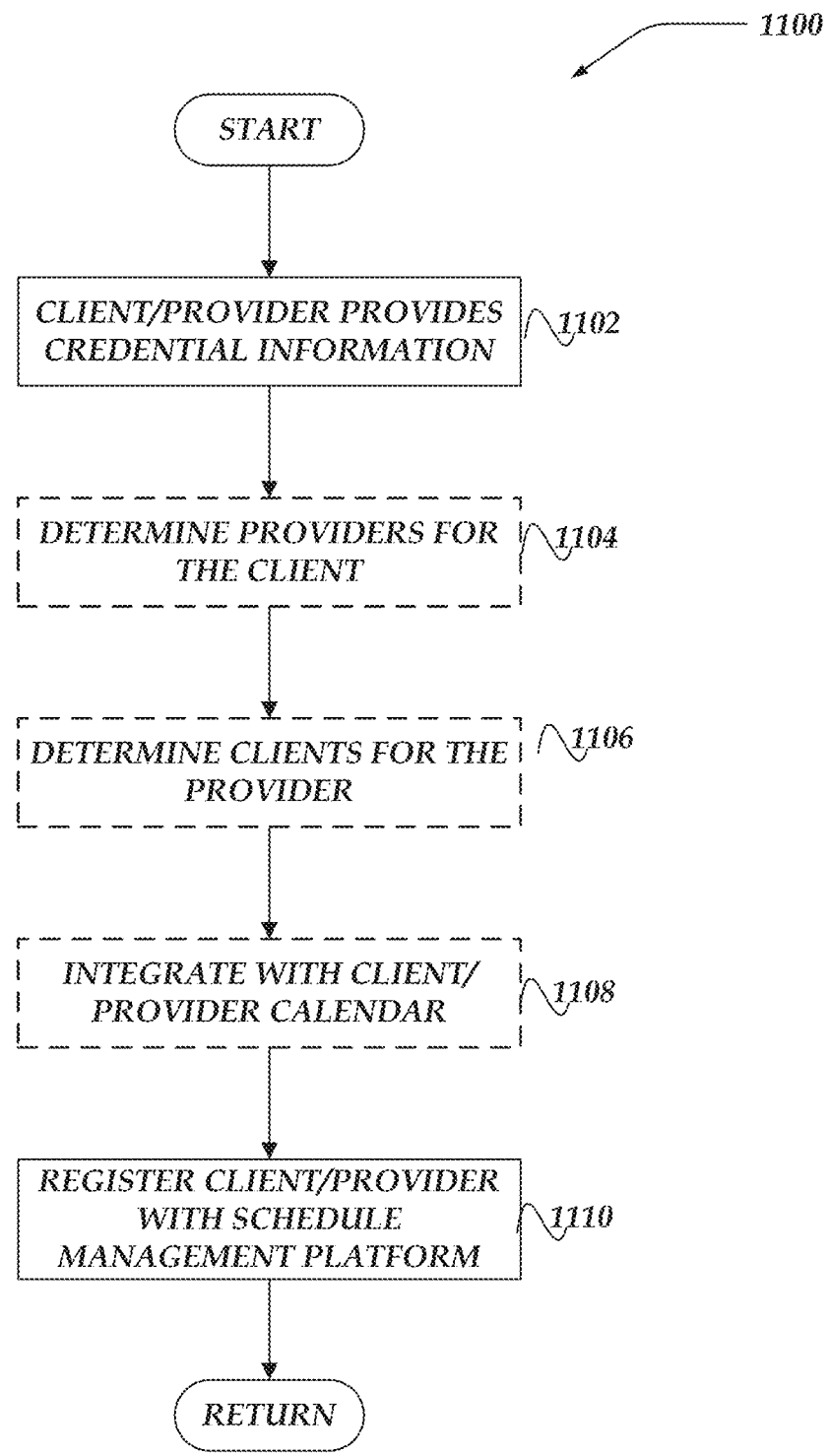
FIG. 11 illustrates a flowchart of a process for registering customers or providers with a schedule management platform for availability based resource scheduling in accordance with one or more of the various embodiments.

Next, in one or more of the various embodiments, control may be returned to a calling process. FIG. 11 illustrates a flowchart of process 1100 for registering clients or providers with a schedule management platform for availability based resource scheduling in accordance with one or more of the various embodiments. After a start block, at block 1102, in one or more of the various embodiments, one or more clients or one or more providers may provide credential information to a scheduling engine. As described above, scheduling engines may be arranged to enable clients or providers to sign up directly with a schedule management platform.

In one or more of the various embodiments, schedule management platforms may be arranged to provide various options that may enable users (e.g., clients or providers) to provide credential information, including, mobile applications, web applications, desktop applications, automated attendants, interactive voice response systems, interactive chat robots, live client agents, or the like.

In some embodiments, scheduling engines may be arranged to enable organizations, clients, providers, or the like, to determine the evidence that may be required to authenticate users. Similarly, in some embodiments, scheduling engines may be arranged to enable organizations, service providers, clients, providers, or the like, to determine or configure the security protocols to put in place, such as, two-factor authorization, personal cryptographic certificates, or the like.

At block 1104, in one or more of the various embodiments, optionally, the scheduling engine may be arranged to determine one or more providers for the client. In one or more of the various embodiments, schedule management platforms may be arranged to be open, closed, multi-tenant, single tenant, or the like. Accordingly, in one or more of the various embodiments, scheduling engines may be arranged to enable organizations to configure schedule management platforms to determine the providers that may be available to a client in a given context. For example, in some embodiments, closed platforms may limit clients to a particular set of providers. In some embodiments, closed schedule management platforms may strictly define the providers that may be determined for a given client. In contrast, in some embodiments, open schedule management platforms may enable clients to select freely from all the providers that may be included on the schedule management platform.

In one or more of the various embodiments, schedule management platforms may be arranged to enable individual providers or groups of providers to define criteria that may be used to filter or pre-qualify clients. For example, in some embodiments, providers that operate within a restricted or limited geographic area may be enabled to exclude clients that are outside the area.

Further, in some embodiments, schedule management platforms may be arranged to enable providers and clients to link up by exchange pin numbers, passwords, or the like. For example, an independent provider may provider clients a code or pin number that may be provided as part of the client's credentials. Accordingly, in some embodiments, scheduling engines may be arranged to pair the client with the provider(s) that correspond to the provided code or pin number.

In one or more of the various embodiments, schedule management platforms may be arranged to enable clients send requests for association to providers that the providers may accept or deny. For example, in some embodiments, scheduling engines may be arranged to provide a list of providers to a client. The client may send one or more providers in the list a request to associate. Thus, if the provider accepts the request, the client and provider may be associated.

Note, this block is indicated as being optional because for some embodiments the pending user may be a provider rather than a client.

At block 1106, in one or more of the various embodiments, optionally, the scheduling engine may be arranged to determine the clients for the provider. Similar to as described for block 1104, scheduling engines may be arranged to determine one or more clients for a provider. In some embodiments, schedule management platforms may be arranged to enable organizations to configure the schedule management platform to automatically associate a set of clients with a provider based on the clients prior associated with the organization. For example, in some embodiments, a health clinic may configure the schedule management platform to automatically associate providers and clients based on existing information that has already been used to associate clients and providers.

In some embodiments, scheduling engines may be arranged to enable organizations that are membership oriented to automatically associate some or all of their providers with clients that are members of the organization. For example, in some embodiments, health clinics that have providers and patients may configure the schedule management platform to automatically associate their providers and patients. Likewise, in some embodiments, a fitness center may configure a schedule management platform to automatically associate its members (e.g., clients) with its providers (e.g., physical trainers, massage therapists, or the like).

Note, this is indicated as being optional because in some embodiments the pending user may be a client rather than a provider.

At block 1108, in one or more of the various embodiments, optionally, scheduling engines may be arranged to enable clients or providers to integrate with one or more calendar systems. In some embodiments, scheduling engines may be arranged to request permission for providers or clients to access one or more their calendar. Accordingly, in some embodiments, scheduling engines may be arranged to employ client/provider calendar information to provide scheduling decisions or recommendations. For example, for some embodiments, scheduling engines may be arranged to use client calendar information to determine in part if clients should be offered/notified of open appointments.

In one or more of the various embodiments, scheduling engines may be arranged to integrate with an organization's internal scheduling or planning system to obtain calendar information for providers.

Note, this block is indicated as being optional because in some embodiments schedule management platforms or organizations may not enable or require calendar integration.

At block 1110, in one or more of the various embodiments, the client or provider may be registered with the schedule management platform. In one or more of the various embodiments, scheduling engines may be arranged to associate the client with one or more providers (or organizations). Likewise, in some embodiments, scheduling engines may be arranged to associate a provider with one or more clients or organizations.

In one or more of the various embodiments, registering clients or providers enables scheduling engines to determine which clients should be notified for a given open appointment slot. However, in some embodiments, scheduling engines may be arranged to enable organizations to provide or modify the rules for determining which clients should be notified for a given open appointment.

Next, in one or more of the various embodiments, control may be returned to a calling process.

Figure 12:
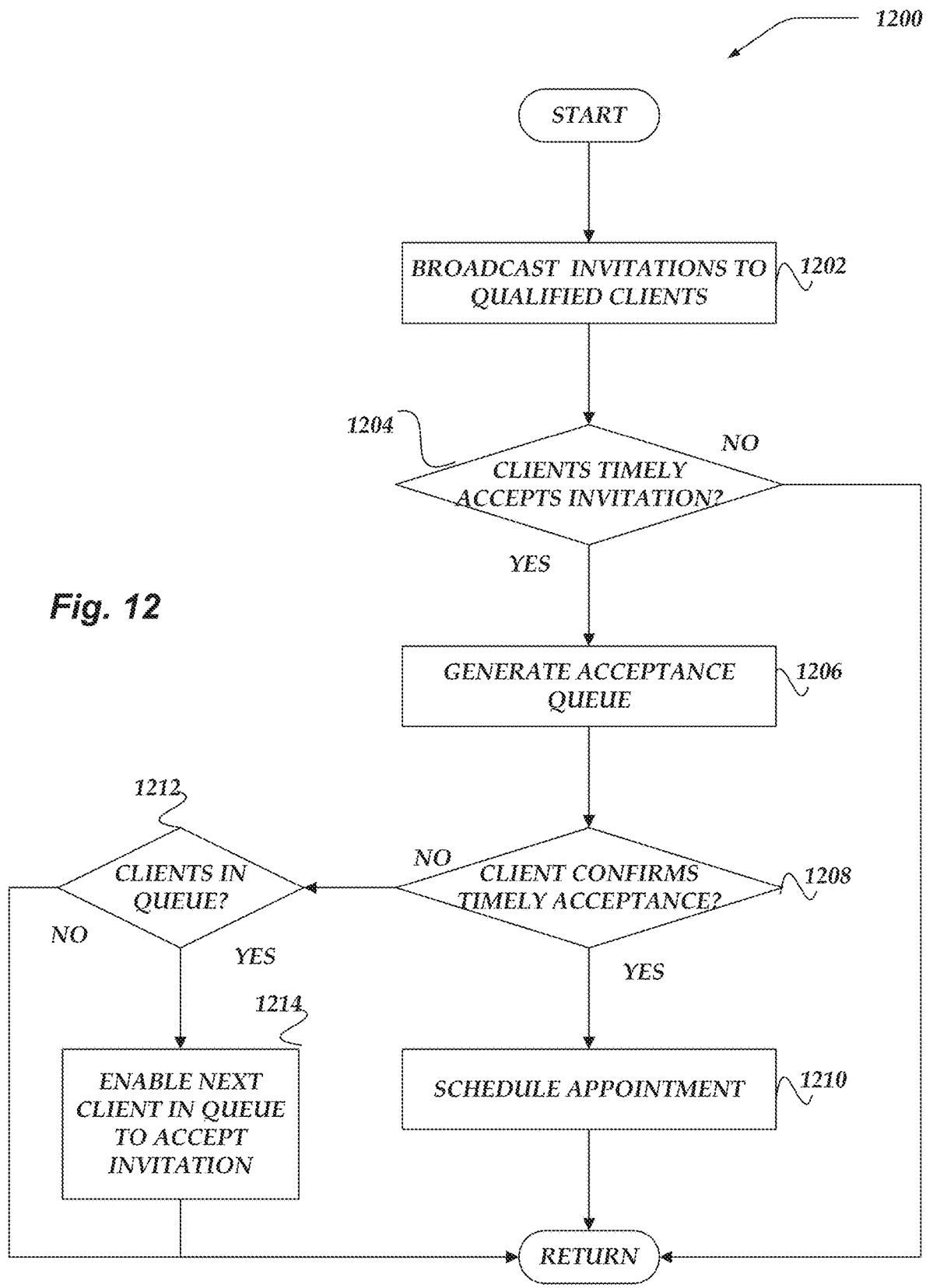
FIG. 12 illustrates a flowchart of a process for broadcast notification of qualified clients for availability based resource scheduling in accordance with one or more of the various embodiments.

FIG. 12 illustrates a flowchart of process 1000 for managing broadcast notifications for availability based resource scheduling in accordance with one or more of the various embodiments. After a start block, at block 1202, in one or more of the various embodiments, a scheduling engine may be arranged to broadcast notifications that include an invitation to accept an appointment to two or more qualified clients.

At decision block 1204, in one or more of the various embodiments, if one or more clients may timely accept the invitation to accept the appointment, control may flow to block 1206; otherwise, control may be returned to a calling process because the appointment expired or was otherwise closed before a qualified accepted it.

In one or more of the various embodiments, scheduling engines may be arranged to enable more than one qualified client to accept the invitation. However, in some embodiments, scheduling engines may be arranged to the provide the first qualified client that accepts the invitation a time-limited reservation on the appointment so they can confirm their acceptance.

At block 1206, in one or more of the various embodiments, scheduling engines may be arranged to generate an acceptance queue based on the order the qualified clients accepted the invitation. In some embodiments, scheduling engines may be arranged to enable qualified clients to wait in the acceptance queue while the current qualified client with the time-limited reservation on the appointment determines if they will confirm their acceptance of the invitation.

At decision block 1208, if the qualified client with the reservation on the appointment timely confirms their acceptance of the invitation, control may flow block 1201; otherwise, control may flow to decision block 1212.

At block 1210, in one or more of the various embodiments, scheduling engines may be arranged to schedule to appointments associated with the invitation with the qualified client that timely confirmed their acceptance of the invitation.

At decision block 1212, if there may be qualified clients in the acceptance queue, control may flow to block 1214, otherwise, control may be returned to a calling process.

At block 1214, in one or more of the various embodiments, scheduling engines may be arranged to determine the next qualified client from the acceptance queue and enable them to accept the invitation. In some embodiments, if the next qualified client fails to timely confirm their acceptance the invitation, the next qualified client in the acceptance queue may be enabled to confirm their acceptance. This cycle may continue until a qualified client confirms their acceptance of the invitation, the acceptance queue may be exhausted, the appointment expires, or the like.

Also, in one or more of the various embodiments, scheduling engines may be arranged to enable qualified clients that did not timely accept the invitation to opt-in to the acceptance queue. Accordingly, in some embodiments, scheduling engines may be arranged to enable qualified clients that received the notification and passed on it to monitor if the appointment has been accepted and confirm. Thus, in some embodiments, as long as an open appointment has not been assigned to a client, scheduling engines may be arranged to enable qualified clients to join the acceptance queue for the appointment. Accordingly, in some embodiments, qualified clients that opt-in later may be added to the end of the acceptance queue.

Further, in some embodiments, scheduling engines may be arranged to enable qualified clients that failed to timely confirm their acceptance of the invitation to opt back into the acceptance queue. In some embodiments, if it is the first time a qualified client opts back into the acceptance queue, they may be placed at the beginning of the acceptance queue ahead of other qualified clients currently in the acceptance queue.

In one or more of the various embodiments, scheduling engines may be arranged to enable qualified clients to opt back into the acceptance queue multiple times as long as the appointment remains open. However, in some embodiments, such qualified clients may be placed at the back of the acceptance queue rather than at the beginning.

Next, in some embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Uses Cases

FIG. 13 illustrates a logical representation of a portion of user interface 1300 for availability based resource scheduling in accordance with one or more of the various embodiments. In some embodiments, user interface 1300 may be arranged to include one or more sections, such as, section 1302, section 1304, section 1306, section 1308, section 1310, section 1312, section 1314, or the like.

In one or more of the various embodiments, user interface 1300 may be displayed on one or more hardware displays, such as, client computer displays, mobile device displays, or the like. In some embodiments, user interface 1300 may be provided via a native desktop application, native mobile applications, or as a web application hosted in a web browser or other similar applications. One of ordinary skill in the art will appreciate that for at least clarity or brevity many details common to commercial/production user interfaces have been omitted from user interface 1300. Likewise, in some embodiments, user interfaces may be arranged differently than shown depending on local circumstances or local requirements. However, one of ordinary skill in the art will appreciate that the disclosure/description of user interface 1300 is at least sufficient for disclosing the innovations included herein.

In this example, user interface 1300 includes various sections that may be directed towards various features of schedule management platform including generating a selection model for determine qualified clients.

In this example, section 1302 includes buttons or tabs for switching the view or appearance of user interface 1300 depending on the needs of the user. In this example, for some embodiments, section 1302 includes a button or tab for making new alerts (e.g., notifications), reviewing saved alerts, reviewing active alerts, reviewing closed alerts, or the like.

Also, in this example, section 1304 provides user interface controls (e.g., pick lists, search fields, or the like) for selecting among available providers. In some embodiments, scheduling engines may be arranged to automatically filter the providers list to include unassigned providers that may be available to service the open appointment. In some embodiments, scheduling engines may be arranged to provide user interface controls that enable users to establish one or more filter values or criteria for selecting providers.

In this example, for some embodiments, section 1306 includes user interface controls that enable the user to select if the notifications of the open appointment should be delivered to qualified clients serially or by broadcast.

In this example, for some embodiments, section 1308 includes user interface controls for setting various details for the notification, including, date, time, duration, or the like. In some embodiments, scheduling engines may be arranged to automatically populate such user interface controls based on calendar information provided by providers or organizations via integration with provider calendars, organization scheduling/practice management systems, or the like.

In this example, for some embodiments, section 1310 includes user interface controls that enable acceptance timeouts or confirmation timeouts to be set for the open appointment. In some embodiments, scheduling engines may be arranged to automatically populate such user interface controls with values based on configuration information.

In this example, for some embodiments, section 1312 includes an interactive table that lists qualified clients for the open appointment. In one or more of the various embodiments, tables or lists included in a user interface may be customized depending on the needs of organizations, providers, or the like. Thus, in some embodiments, the fields or columns display in client table or list may vary depending on the organization, providers, appointment type, or the like.

In this example, for some embodiments, section 1314 represents a portion of user interface 1300 that enables users to include various filters, rules, conditions, or the like, that may be included selection models used to determine qualified clients.

What is claimed as new desired to be protected by Letter Patent of the United States is:

1. A method for managing resources over a network using one or more network computers that include one or more processors that perform actions, comprising:
    determining one or more resources that are unassigned to one or more open appointments;
    generating one or more selection models based on the one or more open appointments and one or more characteristics of one or more clients, wherein the one or more selection models include machine learning classifiers and one or more of heuristics, formulas, conditions, instructions, parameters, or state machines;
    determining a criteria for pre-qualifying each of the one or more clients to receive one or more invitations to the one or more open appointments, wherein the criteria includes one or more of geographic location, password, personal identification number (PIN), a resource previously assigned to an open appointment accepted by the one or more clients, an organization currently associated with the one or more clients, or calendar availability information for the one or more clients or the one or more resources;
    employing the criteria and the one or more selection models to determine each client that is qualified to accept one or more invitations to the one or more open appointments;
    providing the one or more invitations to accept the one or more open appointments to the one or more qualified clients based on one or more notification models that define one or more communication modes to communicate the one or more invitations with the one or more candidate clients over a period of time;
    reserving an open appointment based on a qualified client accepting an invitation to the open appointment;
    in response to the qualified client confirming the acceptance of the invitation to the open appointment and before expiry of the period of time, closing the open appointment by assigning the one or more resources and the qualified client to the closed appointment; and
    in response to expiry of the period of time and non-confirmation by the qualified client for the open appointment, performing further actions, including:
        unreserving the open appointment for the qualified client;
        employing the one or more selection models to determine one or more other qualified clients that are qualified to accept one or more invitations to the one or more open appointments; and providing the one or more invitations to accept the one or more open appointments to the one or more other qualified clients based on the one or more notification models; and employing a global positioning systems (GPS) device to provide geo-location information for the qualified client, wherein the geolocation information is employed to select one or more of a time zone, spoken language, financial currency, or calendar format for inclusion in the one or more invitations provided to each qualified client.

2. The method of claim 1, wherein determining the one or more qualified clients, further comprises, rank ordering the one or more qualified clients based on selection criteria provided by the one or more selection models, wherein the selection criteria includes one or more of location, priority, services requested, service recommended, requested by the provider, or credit history.

3. The method of claim 1, wherein providing the one or more invitations, further comprises:
   starting a first confirmation timer that is associated with the invitation being provided to a first qualified client;
   in response to the first confirmation timer expiring before the first qualified client accepts the invitation, performing further actions, including:
      determining a next qualified client from a remainder of the one or more other qualified clients;
      starting a next confirmation timer that is associated with the invitation being provided to the next qualified client;
      in response to the next qualified client confirming the invitation before the expiry of the next confirmation timer, closing the open appointment by assigning the one or more resources and the next qualified client to the closed appointment.

4. The method of claim 1, wherein determining the one or more qualified clients, further comprises:
   providing calendar information that corresponds to the one or more qualified clients from one or more calendar providers, wherein the calendar providers include one or more of a mobile device, a service provider, or a third-party schedule management application; and
   modifying the one or more selection models based on the calendar information.

5. The method of claim 1, wherein generating the one or more selection models, further comprises:
   displaying one or more characteristics of the one or more clients in a user interface; and
   employing selection of one or more portions of the one or more characteristics of the clients to generate the one or more selection models.

6. The method of claim 1, wherein providing the one or more invitations, further comprises,
   broadcasting the one or more invitations to each of the one or more qualified clients concurrently;
   in response to one or more other qualified clients accepting the one or more invitations, generating an acceptance queue that includes the one or more other qualified clients, wherein the acceptance queue is ordered based on an order that the one or more other qualified clients accepted the invitation; and
   enabling each other qualified client in turn to confirm the acceptance of the invitation to the open appointment based on the acceptance queue.

7. A system for managing resources over a network, comprising:
   a network computer, comprising:

a memory that stores at least instructions; and
one or more processors that execute instructions that perform actions, including:
   determining one or more resources that are unassigned to one or more open appointments;
   generating one or more selection models based on the one or more open appointments and one or more characteristics of one or more clients, wherein the one or more selection models include machine learning classifiers and one or more of heuristics, formulas, conditions, instructions, parameters, or state machines;
   determining a criteria for pre-qualifying each of the one or more clients to receive one or more invitations to the one or more open appointments, wherein the criteria includes one or more of geographic location, password, personal identification number (PIN), a resource previously assigned to an open appointment accepted by the one or more clients, an organization currently associated with the one or more clients, or calendar availability information for the one or more clients or the one or more resources;
   employing the criteria and the one or more selection models to determine each client that is qualified to accept one or more invitations to the one or more open appointments;
   providing the one or more invitations to accept the one or more open appointments to the one or more qualified clients based on one or more notification models that define one or more communication modes to communicate the one or more invitations with the one or more candidate clients over a period of time;
   reserving an open appointment based on a qualified client accepting an invitation to the open appointment;
   in response to the qualified client confirming the acceptance of the invitation to the open appointment and before expiry of the period of time, closing the open appointment by assigning the one or more resources and the qualified client to the closed appointment; and
   in response to expiry of the period of time and non-confirmation by the qualified client for the open appointment, performing further actions, including:
      unreserving the open appointment for the qualified client;
      employing the one or more selection models to determine one or more other qualified clients that are qualified to accept one or more invitations to the one or more open appointments; and
      providing the one or more invitations to accept the one or more open appointments to the one or more other qualified clients based on the one or more notification models; and
   employing a global positioning systems (GPS) device to provide geo-location information for the qualified client, wherein the geolocation information is employed to select one or more of a time zone, spoken language, financial currency, or calendar format for inclusion in the one or more invitations provided to each qualified client; and
a client computer, comprising:
   another memory that stores at least instructions; and one or more processors that execute instructions that
perform actions, including:
providing one or more communications that indicate an acceptance of an invitation.

8. The system of claim 7, wherein determining the one or more qualified clients, further comprises, rank ordering the one or more qualified clients based on selection criteria provided by the one or more selection models, wherein the selection criteria includes one or more of location, priority, services requested, service recommended, requested by the provider, or credit history.

9. The system of claim 7, wherein providing the one or more invitations, further comprises:
starting a first confirmation timer that is associated with the invitation being provided to a first qualified client;
in response to the first confirmation timer expiring before the first qualified client accepts the invitation, performing further actions, including:
determining a next qualified client from a remainder of the one or more other qualified clients;
starting a next confirmation timer that is associated with the invitation being provided to the next qualified client;
in response to the next qualified client confirming the invitation before the expiry of the next confirmation timer, closing the open appointment by assigning the one or more resources and the next qualified client to the closed appointment.

10. The system of claim 7, wherein determining the one or more qualified clients, further comprises:
providing calendar information that corresponds to the one or more qualified clients from one or more calendar providers, wherein the calendar providers include one or more of a mobile device, a service provider, or a third-party schedule management application; and
modifying the one or more selection models based on the calendar information.

11. The system of claim 7, wherein generating the one or more selection models, further comprises:
displaying one or more characteristics of the one or more clients in a user interface; and
employing selection of one or more portions of the one or more characteristics of the clients to generate the one or more selection models.

12. The system of claim 7, wherein providing the one or more invitations, further comprises,
broadcasting the one or more invitations to each of the one or more qualified clients concurrently;
in response to one or more other qualified clients accepting the one or more invitations, generating an acceptance queue that includes the one or more other qualified clients, wherein the acceptance queue is ordered based on an order that the one or more other qualified clients accepted the invitation; and
enabling each other qualified client in turn to confirm the acceptance of the invitation to the open appointment based on the acceptance queue.

13. A processor readable non-transitory storage media that includes instructions for managing resources over a network, wherein execution of the instructions by one or more hardware processors performs actions, comprising:
determining one or more resources that are unassigned to one or more open appointments;
generating one or more selection models based on the one or more open appointments and one or more characteristics of one or more clients, wherein the one or more selection models include machine learning classifiers and one or more of heuristics, formulas, conditions, instructions, parameters, or state machines;
determining a criteria for pre-qualifying each of the one or more clients to receive one or more invitations to the one or more open appointments, wherein the criteria includes one or more of geographic location, password, personal identification number (PIN), a resource previously assigned to an open appointment accepted by the one or more clients, an organization currently associated with the one or more clients, or calendar availability information for the one or more clients or the one or more resources;
employing the criteria and the one or more selection models to determine each client that is qualified to accept one or more invitations to the one or more open appointments;
providing the one or more invitations to accept the one or more open appointments to the one or more qualified clients based on one or more notification models that define one or more communication modes to communicate the one or more invitations with the one or more candidate clients over a period of time;
reserving an open appointment based on a qualified client accepting an invitation to the open appointment;
in response to the qualified client confirming the acceptance of the invitation to the open appointment and before expiry of the period of time, closing the open appointment by assigning the one or more resources and the qualified client to the closed appointment; and
in response to expiry of the period of time and non-confirmation by the qualified client for the open appointment, performing further actions, including:
unreserving the open appointment for the qualified client;
employing the one or more selection models to determine one or more other qualified clients that are qualified to accept one or more invitations to the one or more open appointments; and
providing the one or more invitations to accept the one or more open appointments to the one or more other qualified clients based on the one or more notification models; and
employing a global positioning systems (GPS) device to provide geo-location information for the qualified client, wherein the geolocation information is employed to select one or more of a time zone, spoken language, financial currency, or calendar format for inclusion in the one or more invitations provided to each qualified client.

14. The media of claim 13, wherein determining the one or more qualified clients, further comprises, rank ordering the one or more qualified clients based on selection criteria provided by the one or more selection models, wherein the selection criteria includes one or more of location, priority, services requested, service recommended, requested by the provider, or credit history.

15. The media of claim 13, wherein providing the one or more invitations, further comprises:
starting a first confirmation timer that is associated with the invitation being provided to a first qualified client;
in response to the first confirmation timer expiring before the first qualified client accepts the invitation, performing further actions, including:
determining a next qualified client from a remainder of the one or more other qualified clients;

starting a next confirmation timer that is associated with the invitation being provided to the next qualified client;

in response to the next qualified client confirming the invitation before the expiry of the next confirmation timer, closing the open appointment by assigning the one or more resources and the next qualified client to the closed appointment.

16. The media of claim 13, wherein determining the one or more qualified clients, further comprises:
providing calendar information that corresponds to the one or more qualified clients from one or more calendar providers, wherein the calendar providers include one or more of a mobile device, a service provider, or a third-party schedule management application; and
modifying the one or more selection models based on the calendar information.

17. The media of claim 13, wherein generating the one or more selection models, further comprises:
displaying one or more characteristics of the one or more clients in a user interface; and
employing selection of one or more portions of the one or more characteristics of the clients to generate the one or more selection models.

18. The media of claim 13, wherein providing the one or more invitations, further comprises,
broadcasting the one or more invitations to each of the one or more qualified clients concurrently;
in response to one or more other qualified clients accepting the one or more invitations, generating an acceptance queue that includes the one or more other qualified clients, wherein the acceptance queue is ordered based on an order that the one or more other qualified clients accepted the invitation; and
enabling each other qualified client in turn to confirm the acceptance of the invitation to the open appointment based on the acceptance queue.

19. A network computer for managing resources over a network, comprising:
a memory that stores at least instructions; and
one or more processors that execute instructions that perform actions, including:
determining one or more resources that are unassigned to one or more open appointments;
generating one or more selection models based on the one or more open appointments and one or more characteristics of one or more clients, wherein the one or more selection models include machine learning classifiers and one or more of heuristics, formulas, conditions, instructions, parameters, or state machines;
determining a criteria for pre-qualifying each of the one or more clients to receive one or more invitations to the one or more open appointments, wherein the criteria includes one or more of geographic location, password, personal identification number (PIN), a resource previously assigned to an open appointment accepted by the one or more clients, an organization currently associated with the one or more clients, or calendar availability information for the one or more clients or the one or more resources;
employing the criteria and the one or more selection models to determine each client that is qualified to accept one or more invitations to the one or more open appointments;
providing the one or more invitations to accept the one or more open appointments to the one or more qualified clients based on one or more notification models that define one or more communication modes to communicate the one or more invitations with the one or more candidate clients over a period of time;
reserving an open appointment based on a qualified client accepting an invitation to the open appointment;
in response to the qualified client confirming the acceptance of the invitation to the open appointment and before expiry of the period of time, closing the open appointment by assigning the one or more resources and the qualified client to the closed appointment; and
in response to expiry of the period of time and non-confirmation by the qualified client for the open appointment, performing further actions, including:
unreserving the open appointment for the qualified client;
employing the one or more selection models to determine one or more other qualified clients that are qualified to accept one or more invitations to the one or more open appointments; and
providing the one or more invitations to accept the one or more open appointments to the one or more other qualified clients based on the one or more notification models; and
employing a global positioning systems (GPS) device to provide geo-location information for the qualified client, wherein the geolocation information is employed to select one or more of a time zone, spoken language, financial currency, or calendar format for inclusion in the one or more invitations provided to each qualified client.

20. The network computer of claim 19, wherein determining the one or more qualified clients, further comprises, rank ordering the one or more qualified clients based on selection criteria provided by the one or more selection models, wherein the selection criteria includes one or more of location, priority, services requested, service recommended, requested by the provider, or credit history.

21. The network computer of claim 19, wherein providing the one or more invitations, further comprises:
starting a first confirmation timer that is associated with the invitation being provided to a first qualified client;
in response to the first confirmation timer expiring before the first qualified client accepts the invitation, performing further actions, including:
determining a next qualified client from a remainder of the one or more other qualified clients;
starting a next confirmation timer that is associated with the invitation being provided to the next qualified client;
in response to the next qualified client confirming the invitation before the expiry of the next confirmation timer, closing the open appointment by assigning the one or more resources and the next qualified client to the closed appointment.

22. The network computer of claim 19, wherein determining the one or more qualified clients, further comprises:
providing calendar information that corresponds to the one or more qualified clients from one or more calendar providers, wherein the calendar providers include one or more of a mobile device, a service provider, or a third-party schedule management application; and
modifying the one or more selection models based on the calendar information.

23. The network computer of claim 19, wherein generating the one or more selection models, further comprises:
- displaying one or more characteristics of the one or more clients in a user interface; and
- employing selection of one or more portions of the one or more characteristics of the clients to generate the one or more selection models.

24. The network computer of claim 19, wherein providing the one or more invitations, further comprises,
- broadcasting the one or more invitations to each of the one or more qualified clients concurrently;
- in response to one or more other qualified clients accepting the one or more invitations, generating an acceptance queue that includes the one or more other qualified clients, wherein the acceptance queue is ordered based on an order that the one or more other qualified clients accepted the invitation; and
- enabling each other qualified client in turn to confirm the acceptance of the invitation to the open appointment based on the acceptance queue.

* * * * *